United States Patent
Patel et al.

(10) Patent No.: US 10,015,073 B2
(45) Date of Patent: Jul. 3, 2018

(54) AUTOMATIC OPTIMAL ROUTE REFLECTOR ROOT ADDRESS ASSIGNMENT TO ROUTE REFLECTOR CLIENTS AND FAST FAILOVER IN A NETWORK ENVIRONMENT

(71) Applicant: CISCO TECHNOLOGY, INC., San Jose, CA (US)

(72) Inventors: Keyur Patel, San Jose, CA (US); Serpil Bayraktar, Los Gatos, CA (US); Manish Bhardwaj, San Francisco, CA (US); David Delano Ward, Los Gatos, CA (US); Burjiz Pithawala, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 283 days.

(21) Appl. No.: 14/809,017

(22) Filed: Jul. 24, 2015

(65) Prior Publication Data
US 2016/0248658 A1    Aug. 25, 2016

Related U.S. Application Data

(60) Provisional application No. 62/119,044, filed on Feb. 20, 2015, provisional application No. 62/119,048, (Continued)

(51) Int. Cl.
*H04L 12/751*    (2013.01)
*H04L 12/721*    (2013.01)
(Continued)

(52) U.S. Cl.
CPC ............ *H04L 45/02* (2013.01); *H04L 45/127* (2013.01); *H04L 45/42* (2013.01); *H04L 45/48* (2013.01); *H04L 45/74* (2013.01)

(58) Field of Classification Search
None
See application file for complete search history.

(56) References Cited

U.S. PATENT DOCUMENTS 6,148,000 A    11/2000    Feldman
6,711,152 B1    3/2004    Kalmanek, Jr.
(Continued)

FOREIGN PATENT DOCUMENTS

| EP | 1580940 | 9/2005 |
|---|---|---|
| EP | 1737168 | 12/2006 |
| WO | WO2016/0133821 | 8/2016 |

OTHER PUBLICATIONS

Raszuk, et al., "BGP Optimal Route Reflection (BGP-ORR)", IDR Working Group Internet Draftdraft-ietf-idr-bgp-optimal-route-reflection-08, Oct. 22, 2014, 21 pages https://tools.ietf.org/html/draft-ietf-idr-bgp-optimal-route-reflection-08.

(Continued)

*Primary Examiner* — Yaotang Wang

(57) ABSTRACT

Embodiments are provided for providing optimal route reflector (ORR) root address assignment to route reflector clients and fast failover capabilities in an autonomous system, including identifying a first node in an autonomous system as a candidate root node of a first routing group, identifying a client node based on a neighbor address used in a first routing protocol, mapping the neighbor address to routing information received from the client node via a second routing protocol, and associating the neighbor address with the first routing group if the routing information includes an identifier of the first routing group. In more specific embodiments, identifying the first node as a candidate root node includes determining the first node and the first routing group are advertised in a first protocol packet, (Continued)

and determining the first node and the second routing group are advertised in a second protocol packet.

25 Claims, 13 Drawing Sheets

Related U.S. Application Data filed on Feb. 20, 2015, provisional application No. 62/119,113, filed on Feb. 21, 2015, provisional application No. 62/119,114, filed on Feb. 21, 2015, provisional application No. 62/119,115, filed on Feb. 21, 2015.

(51) Int. Cl.
*H04L 12/741* (2013.01)
*H04L 12/753* (2013.01)
*H04L 12/717* (2013.01)

(56) References Cited

U.S. PATENT DOCUMENTS

| | | | |
|---|---|---|---|
| 7,769,886 B2 | 8/2010 | Naseh | |
| 8,452,871 B2 | 5/2013 | Ge | |
| 8,537,840 B1 | 9/2013 | Raszuk et al. | |
| 8,571,029 B1 * | 10/2013 | Aggarwal | H04L 45/50 370/256 |
| 9,036,504 B1 | 5/2015 | Miller | |
| 9,450,817 B1 | 9/2016 | Bahadur | |
| 2006/0140136 A1 * | 6/2006 | Filsfils | H04L 45/02 370/255 |
| 2006/0195607 A1 | 8/2006 | Naseh | |
| 2007/0091794 A1 | 4/2007 | Filsfils et al. | |
| 2007/0153782 A1 | 7/2007 | Fletcher | |
| 2008/0062861 A1 | 3/2008 | Shand et al. | |
| 2009/0069278 A1 | 3/2009 | Richmond | |
| 2010/0195319 A1 | 8/2010 | Norniella | |
| 2010/0329270 A1 * | 12/2010 | Asati | H04L 45/00 370/401 |
| 2011/0069609 A1 * | 3/2011 | Le Roux | H04L 12/1868 370/221 |
| 2015/0249573 A1 | 9/2015 | Miller | |
| 2016/0248663 A1 | 8/2016 | Patel et al. | |

OTHER PUBLICATIONS

Raszuk, et al., "BGP Optimal Route Reflection (BGP-ORR)," IDR Working Group, July, 2015, 9 pages; https://tools.ietf.org/html/draft-ietf-idr-bgp-optimal-route-reflection-10.

Rekhter, et al., "A Border Gateway Protocol 4 (BGP-4)", IDR, RFC 4271, Jan. 2006, 104 pages; https://tools.ietf.org/html/rfc4271.

Bates, et al., "BGP Route Reflection: An Alternative to Full Mesh Internal BGP (IBGP)", Network Working Group, RFC 4456, Apr. 2006, 12 pages; https://tools.ietf.org/html/rfc4456.

Katz, et al., "Traffic Engineering (TE) Extensions to OSPF Version 2," Network Working Group, RFC 3630, Sep. 2003, 14 pages; https://tools.ietf.org/html/rfc3630.

Pepelnjak, Ivan,"SPF events in OSPF and IS-IS," Mar. 15, 2009, 2 pages; http://wiki.nil.com/SPF_events_in_OSPF_and_IS-IS.

Cisco Systems, Inc., "Intermediate System-to-Intermediate System (IS-IS) TLVs," Document ID: 5739, Aug. 10, 2005, 7 pages; http://www.cisco.com/c/en/us/support/docs/ip/integrated-intermediate-system-to-intermediate-system-is-is/5739-tlvs-5739.html.

PCT May 27, 2016 International Search Report and Written Opinion from International Application Serial No. PCT/US2016/017786; 12 pages.

PCT—Jun. 7, 2016 Partial International Search Report and Opinion from International Application Serial No. PCT/US2016/017909; 6 pages.

* cited by examiner

AUTOMATIC OPTIMAL ROUTE REFLECTOR ROOT ADDRESS ASSIGNMENT TO ROUTE REFLECTOR CLIENTS AND FAST FAILOVER IN A NETWORK ENVIRONMENT

RELATED APPLICATIONS

This application claims the benefit under 35 U.S.C. § 119(e) of: U.S. Provisional Application Ser. No. 62/119,048, filed Feb. 20, 2015, by Keyur Patel, et al., entitled "METHOD AND APPARATUS FOR AUTOMATIC ROOT ADDRESS ASSIGNMENT TO ROUTE REFLECTOR CLIENTS IN A NETWORK ENVIRONMENT," U.S. Provisional Application Ser. No. 62/119,044, filed Feb. 20, 2015, by Keyur Patel, et al., entitled "METHOD AND APPARATUS FOR ADVERTISING ORIGINATING ROUTER INFORMATION FOR BORDER GATEWAY PROTOCOL OPTIMAL ROUTE REFLECTION DEPLOYMENTS IN A NETWORK ENVIRONMENT," U.S. Provisional Application Ser. No. 62/119,113, filed Feb. 21, 2015, by Keyur Patel, et al., entitled "INTERIOR GATEWAY PROTOCOL ROUTER CAPABILITY EXTENSIONS FOR ADVERTISING A NON-TRANSIT NODE IN A NETWORK ENVIRONMENT," U.S. Provisional Application Ser. No. 62/119,115, filed Feb. 21, 2015, by Keyur Patel, et al., entitled "METHOD AND APPARATUS FOR ALLOWING AN OPTIMAL ROUTE REFLECTOR ROOT ADDRESS AS PART OF AN ETHERNET SUBNET IN A NETWORK ENVIRONMENT," U.S. Provisional Application Ser. No. 62/119,114, filed Feb. 21, 2015, by Manish Bhardwaj, et al., entitled "METHOD AND APPARATUS FOR OPTIMIZING SHORTEST PATH FIRST COMPUTATIONS FOR FAST FAILOVER OF PATHS IN AN OPTIMAL ROUTE REFLECTOR IN A NETWORK ENVIRONMENT," all of which are hereby incorporated by reference in their entireties.

TECHNICAL FIELD

This disclosure relates in general to the field of networking, and more particularly, to automatic optimal route reflector (ORR) root address assignment to route reflector clients (RR-clients) and fast failover in a network environment.

BACKGROUND

In computer networking, network administrators are often concerned with how to best route traffic flows from one end point to another end point across a network. Routers may be used in an autonomous system (AS) to determine a node to which network traffic propagating through the autonomous system should be forwarded. Routers communicate with other routers within the autonomous system to determine the best paths through the autonomous system to reach a destination address. Various protocols may be used including Border Gateway Protocol (BGP), which is used for routing between autonomous systems, and an Internal Border Gateway Protocol (iBGP), which is used for routing between routers in the same autonomous system to external destinations. An Interior Gateway Protocol (IGP) is used for routing inside an autonomous system to internal destinations.

In hot potato routing, packets are not stored (or buffered), but are constantly transferred in an attempt to move the packets to their final destination. Hot potato routing attempts to direct traffic to the closest AS egress points within a given BGP network. An egress point is an exit point (e.g., a point of presence (POP) or an edge router) of the autonomous system that may be used to reach an external destination node. Thus, the ability to implement hot potato routing in a BGP route reflection deployment can present significant challenges to network administrators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Overview

Figure 1:
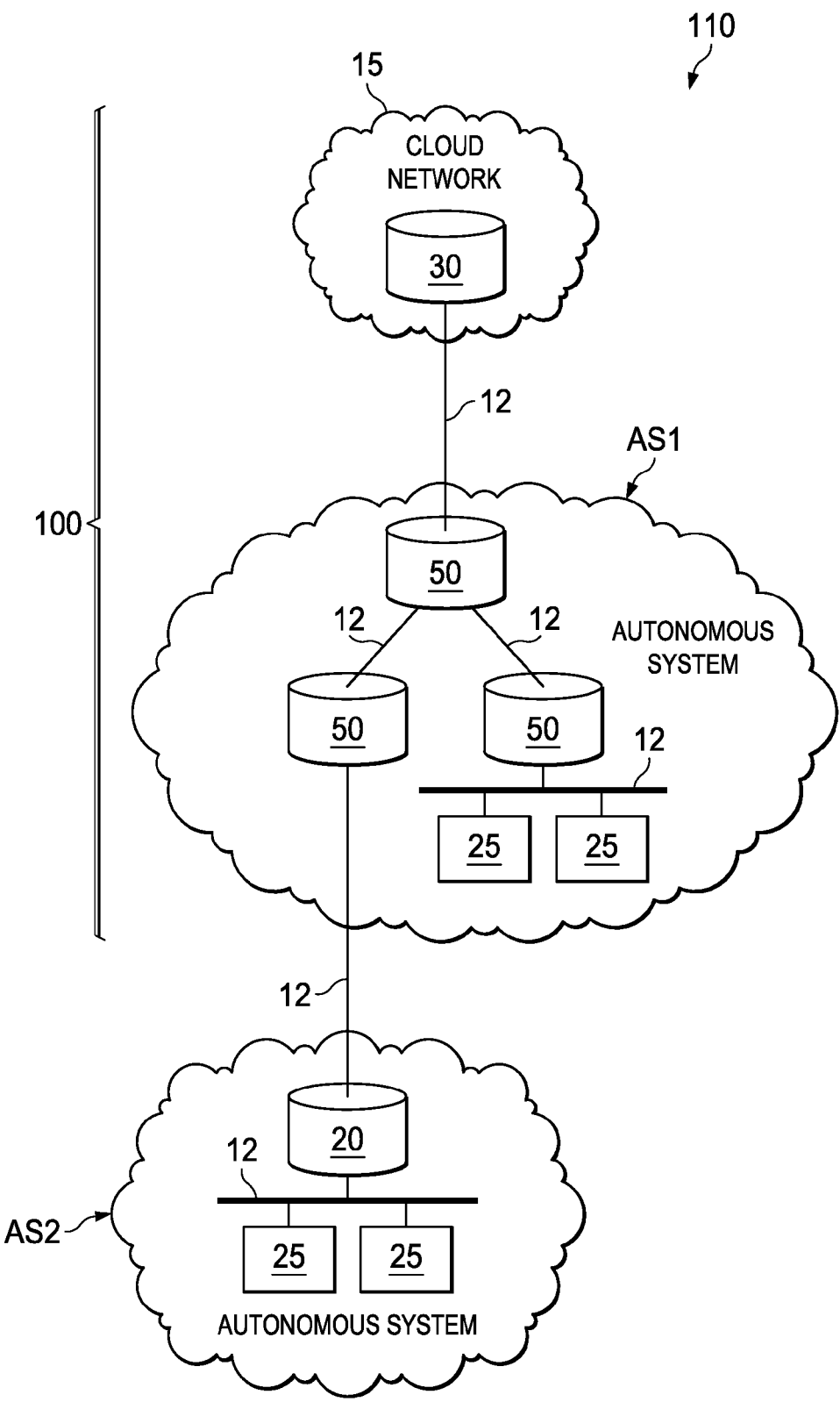
FIG. 1 is a simplified block diagram of a network environment with a communication system for providing optimal route reflection in accordance with at least one embodiment of the present disclosure.

The present disclosure describes an automatic optimal route reflector root address assignment to route reflector clients. A method is provided in one example of the present disclosure and includes identifying, by a cloud-based route reflector, a first node in an autonomous system as a candidate root node of a first routing group. The method also includes identifying a client node based on a neighbor address used in a first routing protocol, mapping the neighbor address to routing information received from the client node via a second routing protocol, and associating the neighbor address with the first routing group if the routing information includes an identifier of the first routing group.

In specific embodiments, the identifying the first node as a candidate root node includes determining the first node and the first routing group are advertised in a first protocol packet, and determining the first node and the second routing group are advertised in a second protocol packet. The determining the first node is advertised in the first and second protocol packets may be based on a router identifier of the first node. The identifying the first node as a candidate root node can also include receiving a protocol packet from one of the first routing protocol or the second routing protocol, the protocol packet including information indicating the first node is to be a root node.

In further specific embodiments, the first node is one of a plurality of nodes identified as candidate root nodes of the first routing group and the method further includes selecting a primary root node from the plurality of nodes. The method may also include computing respective distances between the client node and each one of the candidate root nodes, and determining a shortest one of the respective distances, where the primary root node is selected based on the shortest one of the respective distances. In more specific embodiments, the method includes selecting a backup root node from the plurality of nodes. The method may also include computing respective spanning trees rooted at one or more of the plurality of nodes, and selecting the backup root node based, at least in part, on whether the primary root node is a leaf node in any one of the respective spanning trees. In more specific embodiments, each one of the plurality of nodes is an area border router.

In further specific embodiments, the method includes configuring a protocol packet according to the second routing protocol, the protocol packet indicating that reachability information for the cloud-based route reflector is to be used only for control plane traffic, where the protocol packet is communicated to one or more nodes in the autonomous system. In specific embodiments the method includes receiving a protocol packet originated by the first node, and the protocol packet indicates the first node is associated with a subnet and the first node is to be a root node. In specific embodiments the method includes receiving a protocol packet originated by the first node, and determining a router identifier (ID) of the first node by examining a Type-Length-Value (TLV) element in the protocol packet, where the first node is an edge router of the first routing group. In more specific embodiments, the method includes identifying a client node of a cloud-based route reflector based, at least in part, on a border gateway protocol (BGP) neighbor address of the client node, and associating the BGP neighbor address to the first routing group if the BGP neighbor address corresponds to an interface address advertised by the client node. In further specific embodiments, the first routing protocol is a Border Gateway Protocol Optimal Route Reflector (BGP-ORR) and the second routing protocol is an Interior Gateway Protocol (IGP).

The present disclosure also describes fast failover capabilities in an autonomous system. The method includes determining, in a cloud-based route reflector, whether a first root node is a leaf node in a spanning tree computed for a second root node. The method also includes determining route metric differences associated with a spanning tree computed for the first root node and the spanning tree of the second root node, and populating a delta database with the route metric differences. The second root node is a backup of the first root node according to a failover policy group assigned to a plurality of client nodes in an autonomous system.

In more specific embodiments, each route metric difference is computed by determining a difference between a first route metric of a node in the first spanning tree of the first root node and a second route metric of a corresponding node in the second spanning tree of the second root node. The more specific embodiments, the method includes detecting a failure of the first root node, identifying the second node from the failover policy group, identifying which route metric differences in the delta database associated with the failover policy group are not equal to zero, and communicating the identified route metric differences to one or more listening clients. The one or more listening clients may include a border gateway protocol optimal route reflector process running in the cloud-based route reflector. The one or more listening clients may include the plurality of client nodes. In more specific embodiments, the method further includes performing a constrained spanning tree computation for the second root node to omit the first root node if the first root node is an interior node in the spanning tree computed for the second root node.

Some or all of the elements, operations, and features may be included in respective systems, apparatuses, and devices for performing the described functionality. Furthermore, some or all of the features may be implemented in at least one machine readable storage medium.

Description

FIG. 1 is a simplified block diagram of a network environment 110 including a communication system 100 for providing optimal route reflector (ORR) root address assignment to route reflector clients, fast failover, and Type-Length-Value (TLV) extension capabilities in an autonomous system. Network environment 110 represents a series of points or nodes of interconnected communication paths for receiving and transmitting packets of information that propagate through the network. Network environment 110 offers a communicative interface between nodes, and may include any local area network (LAN), wireless local area network (WLAN), metropolitan area network (MAN), Intranet, Extranet, wide area network (WAN) such as the Internet, cloud network, virtual private network (VPN), or any other appropriate architecture or system that facilitates communications in the network environment. Additionally, network environment 110 may implement a UDP/IP connection and use a TCP/IP communication language protocol in particular embodiments of the present disclosure. Alternatively, any other suitable communication protocol for transmitting and receiving data packets within network environment 110 may be implemented.

Network environment 110 illustrates distributed nodes 20, 30, and 50 being interconnected via communication links 12. Nodes 50 are provisioned in autonomous system AS1 and node 20 is provisioned in an autonomous system AS2. Autonomous systems AS1 and AS2 may be configured as distinct routing domains. Nodes 50 and 20 are network elements, such as routers, that can offer intra-domain routing for electronic data between end nodes 25 within their respective autonomous systems AS1 and AS2. At least some of nodes 20 and 50 can provide inter-domain routing for electronic data. For example, electronic data can be exchanged between end nodes 25 in autonomous system AS1 and other end nodes 25 in autonomous system AS2. Node 30 is network element, such as a router, and may be provisioned in cloud network 15 as a cloud-based route reflector for AS1. In at least one embodiment, cloud network 15 may be physically remote from autonomous system AS1 and may be accessible over the Internet or other wide area network, or any other suitable computer network that interconnects AS1 with node 30. Node 30 may be part of the same routing domain as autonomous system AS1. Node 30 cooperates with nodes 50 to enable cloud-based route reflection with automatic ORR root address assignment to route reflector clients, fast failover, and TLV extensions capabilities.

End nodes 25 are intended to include devices used to initiate a communication in network environment 110, such as desktops, laptops, servers, appliances, mobile devices, or any other device, component, element, or object capable of initiating voice, audio, video, media, or data exchanges within network environment 110. End nodes can also include any device that seeks to initiate a communication on behalf of another entity or element, such as a program, a database, or any other component, device, element, or object capable of initiating an exchange within network environment 110. It should be noted that FIG. 1 is a representation of possible elements of a communication system in a network environment for providing cloud-based optimal route reflection with automatic ORR root address assignment to route reflector clients, fast failover, and TLV extension capabilities in an autonomous system. As such, any number of links 12, nodes 20, 30, and 50, end nodes 25, and other appropriate elements may be configured in the network environment and, more specifically, in the communication system. For example, some autonomous systems may contain thousands of nodes 50 and an even greater number of end nodes 25 and links 12.

For purposes of illustrating certain example techniques of systems disclosed herein, it is important to understand the communications that may be traversing the network and the protocols used in effecting such communications. The following foundational information may be viewed as a basis from which the present disclosure may be properly explained.

Various routing protocols may be implemented in communication system 100 to enable appropriate routing from autonomous system AS1 to autonomous system AS2. Border Gateway Protocol (BGP) is an example routing protocol that enables inter-domain routing between autonomous systems. An external BGP (eBGP) session provides routing information for routes that allow an autonomous system to reach other autonomous systems. An internal BGP (iBGP) session provides routing information for routes inside an autonomous system to external destinations. BGP is a well known routing protocol defined in Request for Comments (RFC) 4271, by Rekhter, Y., Ed., Li, T., Ed., and S. Hares, Ed., "A Border Gateway Protocol 4 (BGP-4)", RFC 4271, DOI 10.17487/RFC4271, January 2006, http://www.rfc-editor.org/info/rfc4271.

A BGP session can be established when BGP neighbor routers (also referred to herein as 'peer nodes') establish a connection in order to 'speak BGP'. This connection is typically established using a connection-oriented protocol such as Transmission Control Protocol (TCP), which ensures delivery of messages between the connected peer nodes. The connected peer nodes can speak BGP to exchange update messages containing routing information. Update messages are used to update information contained in a routing information base (RIB) of the receiving peer node. An update message can announce a new route or withdraw a previously announced route. Update messages can include various fields such as network layer reachability information (NLRI). NLRI may include Internet Protocol (IP) address prefixes of feasible routes being advertised in the update message. Conversely, a field for withdrawn routes may include IP address prefixes for routes being withdrawn because they are no longer reachable. A route is a unit of information that pairs a set of destinations with attributes of a path to those destinations. A path can be defined by one or more attributes and is generally intended to mean the route between two points in a network, such as an autonomous system. IP addresses taken from an IPv4 or IPv6 pool can be divided into two parts including a network section and a host section. The network section identifies a set of destinations and is referred to as a prefix. A prefix in a destination address is used by a routing protocol to render a routing decision for the next hop in the path. A prefix may also be referred to as a 'routing prefix'.

An autonomous system can use iBGP to advertise reachability information for network address prefixes of destinations (e.g., routers) outside the autonomous system. To implement iBGP, however, a full mesh is required in which every router within the autonomous system is connected to every other router via a connection such as TCP. This full mesh requirement can severely limit scalability of an autonomous system running iBGP sessions.

In BGP networks, route reflection is often desirable because a full mesh implementation can be avoided. Route reflector deployments can result in a significant reduction of the number of iBGP sessions needed in the network. Route reflection is a well-known routing protocol defined in Requests for Comment (RFC) 4456, Bates, T., Chen, E., and R. Chandra, "BGP Route Reflection: An Alternative to Full Mesh Internal BGP (IBGP)", RFC 4456, DOI 10.17487/RFC4456, April 2006, http://www.rfc-editor.org/info/rfc4457.

A route reflector (RR) is a network element used in a BGP network to implement route reflection. Route reflection enables routing information to be shared between routers without having to implement a full mesh. In a BGP route reflection deployment, one or more routers are designated as route reflectors and are allowed to accept and propagate iBGP routes to their clients. The designated route reflectors can be fully meshed with iBGP peering sessions between the route reflectors. Each route reflector can peer with multiple routers, which may be referred to herein as route reflector clients ('RR-clients'). In some implementations, the RR-clients of each route reflector form a cluster of routers to which the route reflector is connected. A cluster of routers can be connected via iBGP through their shared route reflector. A route reflector can propagate the routing information it receives from other route reflectors to its RR-clients, and can propagate routing information for its RR-clients to other route reflectors. Thus, the number of sessions needed in a BGP network can be greatly reduced.

In hot potato routing, a router (e.g., route reflector) attempts to render a best path routing decision that directs network traffic to an autonomous system (AS) egress point, within a given BGP network, that is closest to the router rendering the decision. Typically, a route reflector selects the best path based on an interior gateway protocol (IGP) metric computed from its IGP database and announces this path to its RR-client BGP speakers. A metric is the quantitative value used to measure the distance to a given network. Generally, for hot potato routing the best path to a network is the path with the lowest metric.

A route reflector may be embodied as any type of router, including a border or edge router deployed on the perimeter of an autonomous system or as a distributed router in a cloud network, for example. Although route reflectors are usually located in the forwarding path within a cluster (e.g., at the point of presence (POP) boundaries) and stay congruent with the actual topology of the network, virtual route reflectors (vRRs) and possibly other route reflectors may be placed outside of clusters. For example, ring topologies, make it difficult to form route reflector clusters naturally, and tunneled applications, such as Layer 3 Virtual Private Networks (L3VPNs), do not necessarily need route reflectors to be in the forwarding path. In addition, distributed route reflectors may serve as path aggregation points on the network in order to reduce distribution of BGP information to edge routers that may have limited CPU and memory.

Hot potato routing becomes problematic for route reflectors that are not in an optimal forwarding path, including centralized route reflectors such as vRRs. Route reflectors that are not in an optimal forwarding path, or that are placed in such a way in the network that is not congruent with the topology of the network, can lose their ability to advertise a best path to achieve hot potato routing to their clients. Because the choice of an exit point for a route reflector and its clients is the egress point closest to the route reflector, in BGP route reflector deployments where route reflectors are not in an optimal forwarding path, the chosen egress point may not necessarily be the closest egress point to the route reflector clients (RR-clients). Consequently, the best path routing decision rendered by the route reflector and advertised to the RR-clients may not be the best path (e.g., with optimal metrics) to the destination. Thus, deployment of route reflectors may be constrained to appropriate cluster boundaries or at an appropriate central location that facilitates optimum hot potato routing.

BGP Optimal Route Reflection (BGP-ORR) allows route reflectors to operate from a cloud environment without compromising hot potato routing. BGP-ORR requires route reflectors (RRs) to associate their RR-clients with an optimal route reflector (ORR) root address as part of BGP-ORR functionality. An ORR root address is an address in the network where IGP SPFs (Interior Gateway Protocol Shortest Paths First) are rooted to compute Shortest Path First (SPF) topology. SPF logic is an algorithm to determine the shortest path from itself to all other routers in a network. SPF logic can be performed when a routing protocol (e.g., Interior Gateway Protocol (IGP)) causes each router in the network to know about all the other routers and links connecting them. BGP-ORR is a routing protocol defined in Inter-Domain Routing Working Group Internet Draft, by Raszuk, R., Cassar, C., Aman, E., Decraene, B., and S. Litkowski, "BGP Optimal Route Reflection (BGP-ORR)", draft-ietf-idr-bgp-optimal-route-reflection-08, Oct. 22, 2014, https://tools.ietf.org/html/draft-ietf-idr-bgp-optimal-route-reflection-08.

BGP-ORR requires route reflectors to announce a customized BGP best path to its RR-clients. In order to announce the customized best path, route reflectors may do the following: 1) store an IGP database as if it was rooted on the RR-clients, and 2) run a best path algorithm multiple times, once per each client. Storing the IGP database as if it was rooted on the RR-clients can require significant memory and CPU resources. Running the best path algorithm for each individual client may also utilize significant CPU resources. As a network scales upwardly, this can become even more problematic.

BGP-ORR runs SPF logic multiple times to determine shortest paths from one router (referred to herein as 'root node') to other routers in its network. Based on these computations, BGP-ORR can create minimum spanning trees (SPTs) rooted at various configured nodes in one or multiple IGP topologies. RR-clients are associated with an SPT (as an SPF root node) via configuration, and IGP metrics in the SPT are used for best path computation when performing route reflection to the RR-client. IGP metrics can be computed for every node in an SPT, and can represent the link costs or distances between connected nodes in the SPT. The BGP-ORR running in a cloud environment has a view of all IGP topologies via IGP feeds and/or a BGP Link State (BGP-LS) feeds from each IGP area. In at least one scenario, each RR-client is associated with itself as the SPF root, creating an SPT rooted at every RR-client. It should be noted, however, that BGP-ORR residing in a node in a cloud can perform route-reflection for potentially thousands of RR-clients. Therefore, in at least some scenarios, it may be more scalable and sufficient to group RR-clients and associate them with a SPF root, typically an IGP area border router (ABR).

At least one embodiment of the present disclosure can resolve aforementioned issues (and more) associated with a partitioned BGP-ORR network. Embodiments in the present disclosure may be provided in a communication system in which a route reflector, running BGP-ORR, is implemented as a virtual or physical router in a cloud network. This cloud-based route reflector automates the process of selecting SPT roots that are optimal and associating RR-clients to these SPTs. In particular, and in at least one embodiment, a cloud-based route reflector (CBRR) of an autonomous system can automatically associate a root address with a given client edge router in the autonomous system by 1) identifying ABRs located at the cluster boundaries as RR-clients of the cloud-based route reflector, 2) identifying edge routers as RR-clients of the cloud-based route reflector and associating the edge routers to their ABRs, and 3) using ABRs, edge routers and their associations to auto-assign root addresses to the RR-client edge routers. Auto identification of ORR root addresses is particularly useful in a complex network with multiple clusters for enabling auto assignment of ORR root addresses. In addition to edge routers, interior routers may also be identified as RR-clients, associated with an ABR, and assigned a root address. Once the cloud-based route reflector identifies clusters of RR-clients within the autonomous system, it can run best path computations once per cluster.

Figure 2:
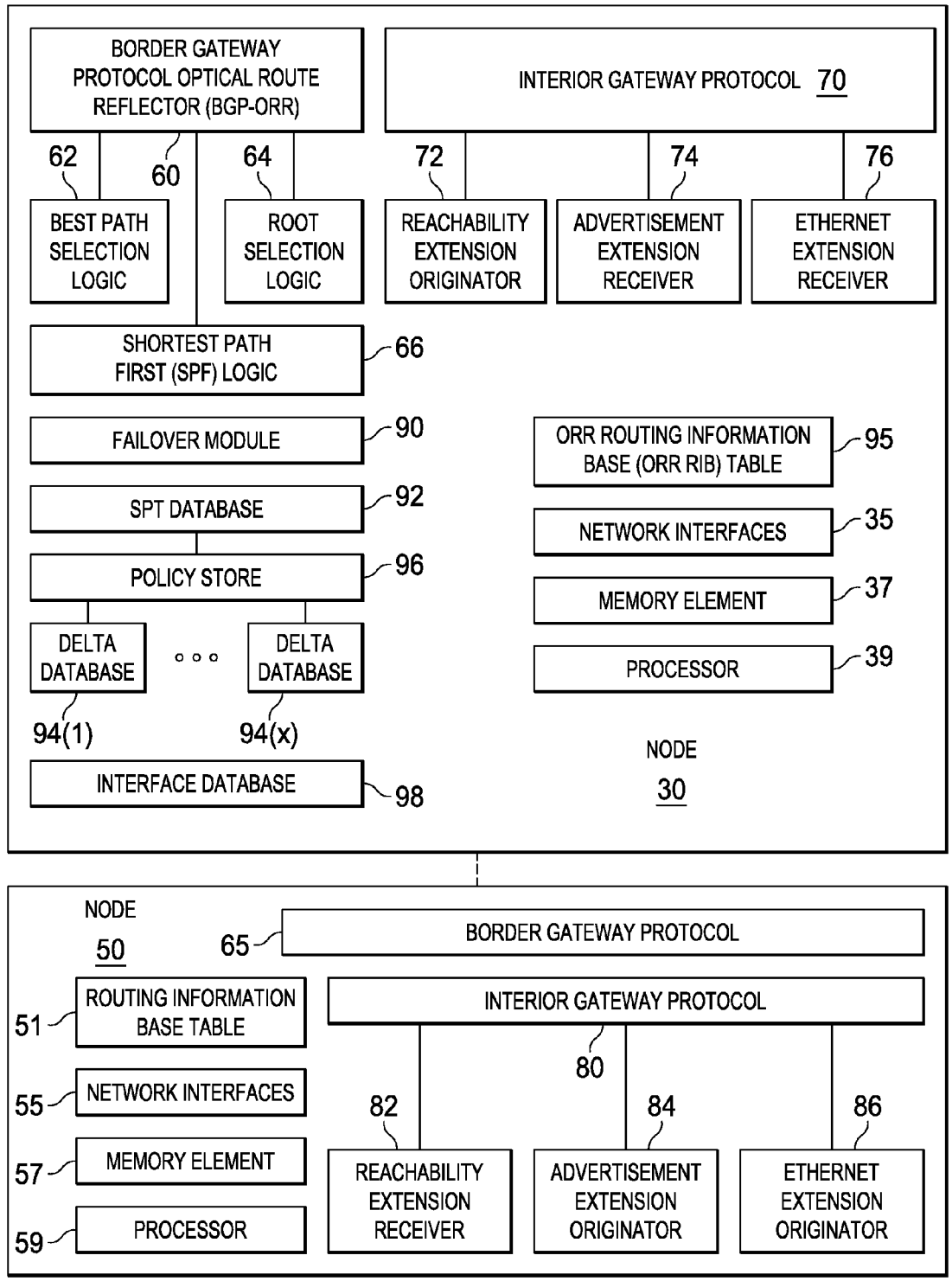
FIG. 2 is a simplified block diagram illustrating possible details associated with example nodes in the communication system according to at least one embodiment.

Turning to FIG. 2, FIG. 2 is a simplified block diagram of possible embodiments of node 30 and nodes 50, as shown in FIG. 1. In embodiments described herein, node 30 is a cloud-based route reflector and node 50 is a route reflector client of the cloud-based route reflector. Nodes 30 and 50 may include, respectively, multiple network interfaces 35 and 55, at least one memory element 37 and 57, and at least one processor 39 and 59. Processors 39 and 59 may be operably coupled to respective network interfaces 35 and 55, which include suitable transmitting and receiving components for communicating over communication links 12 in network environment 110. Furthermore, nodes 30 and/or 50 may be implemented in physical or virtualized environments or any suitable combination thereof.

Routing protocols can be implemented in nodes 30 and 50 to facilitate the automatic ORR root address assignments, fast failover, and type length value (TLV) extension capabilities. Border gateway protocol optimized route reflector (BGP-ORR) 60 can be implemented in node 30, and border gateway protocol (BGP) 65 can be implemented in node 50. BGP communications may be transmitted and received between node 30 and its RR-clients (e.g., node 50) via a transmission protocol such as TCP/IP. In at least one embodiment, BGP-ORR of node 30 also includes root selection logic 64 to automatically select SPF roots that are optimal and are typically area border routers, identify other RR-clients (e.g., edge routers and interior routers), associate the other RR-clients appropriately to the ABRs, and assign root addresses to the RR-clients. BGP-ORR 60 also includes shortest path first (SPF) logic 66 to compute SPFs rooted at particular IGP nodes (e.g., nodes selected by root selection logic 64), and to create SPTs based on the computations. BGP-ORR 60 of node 30 also includes best path selection logic 62 for computing best paths through autonomous system AS1 to reach external destinations such as a node in autonomous system AS2. A network connection can be established between node 50 and node 30 to speak BGP and exchange routing information that can be used to route data from internal nodes of autonomous system AS1 to external destinations.

Interior gateway protocol (IGP) 70 and 80 can be implemented in nodes 30 and 50, respectively. IGP 70 and IGP 80 may include corresponding extension pairs of originators and receivers (e.g., logic, packet header definitions, etc.) to enable certain communications during IGP processing. A reachability extension originator 72 and a corresponding reachability extension receiver 82, can enable node 30 to announce its reachability in IGP (e.g., for BGP session management), and to explicitly indicate that the reachability announced is not to be used for forwarding data traffic. In at least one embodiment, this feature may be implemented with a new type-length-value (TLV) or sub-TLV element of an IGP protocol packet. Although this feature is applicable to a BGP-ORR network, it will be apparent that the feature could be extended to any cloud-based router that is incapable of forwarding, but needs to be part of a control plane in the network.

Another extension pair of IGP 80 and IGP 70 could include an advertisement extension originator 84 and a corresponding advertisement extension receiver 74. Extension pair 74 and 84 enable BGP-ORR 60 to work with multiple partitioned areas (e.g., Open Shortest Path First (OSPF)) or levels (e.g., Intermediate System-to-Intermediate System (IS-IS)) in asynchronous system AS1 by adding enough information to associate routing protocol packets to their originating nodes. In one example, routing protocol packets could include link state advertisements (LSAs) if IGP 70 and IGP 80 implement an OSPF routing protocol. In another example, routing protocol packets could include link state packets (LSPs) if IGP 70 and IGP 80 implement an IS-IS routing protocol. Using the advertisement extension originator 84 and receiver 74 enables a root address to be associated with an edge router, rather than an ABR if this implementation is desired. In at least one embodiment, this feature may be implemented with a new type-length-value (TLV) or sub-TLV element of a protocol packet.

A further extension pair of IGP 80 and IGP 70 could include Ethernet extension originator 86 and Ethernet extension receiver 76. Extension pair 76 and 86 enable an association of host addresses with routing protocol packets (e.g., LSAs or LSPs). Thus, a root address can be associated to a given node when the root address maps to an Ethernet subnet. In at least one embodiment, this feature may be implemented with a new type-length-value (TLV) or sub-TLV element of a link state communication (e.g., LSA or LSP).

Data associated with embodiments described herein may be stored in memory elements 37 and 57 of nodes 30 and 50, respectively, in at least one embodiment. In node 30, the data may include, but is not limited to, an optimal route reflector routing information base (ORR RIB) table 95. ORR RIB table 95 can include all routing information for all routing protocols running in communication system 100. For example, ORR RIB table 95 can include IGP metrics (e.g., a cost or distance) for each BGP next hop, which can be measured from designated root nodes. Also ORR RIB table 95 (or some other suitable storage structure) may include reachability information for network address prefixes advertised by clients of node 30.

In at least one embodiment, other data stored in node 30 could include a spanning tree (SPT) database 92, delta databases 94(1)-94(X), a policy store 96, and an interface database 98. SPT database 92, delta databases 94(1)-94(X), and interface database 98, may be configured as single or multiple storage structures depending on the particular implementation, design, and/or needs. These storage elements may be associated with a failover module 90 in node 30 that performs a fast (or optimized) failover to a backup root node with a backup SPT when a primary root node with a primary SPT becomes unreachable. SPT database 92 can include minimum spanning trees (SPTs), with each SPT rooted at an IGP node in communication system 100. An SPT is a table (which can be logically represented by a tree diagram) of all the nodes in an IGP area or level (or multiple areas or levels) along with IGP metrics associated with each node in the table. SPTs can be created by BGP-ORR 60 computing multiple SPFs, for example, by running SPF logic 66.

Policy store 96 includes one or more failover policy groups. Each policy group defines a sequence of SPTs, one of which can be 'active' at any given time. The active SPT can be used to compute a best path in AS1 for RR-clients to which the policy group is assigned. At least two SPTs can be included in a sequence. One SPT is rooted at a node designated as a primary root node. The second SPT is rooted at a node designated as a first backup root node to the primary root node. Additional SPTs may be included in the sequence and are rooted at nodes designated as additional backup root nodes (e.g., secondary backup, tertiary backup, etc.). Each SPT in a failover policy group includes the same number of IGP nodes. Also, each SPT may be associated with one or more policy groups.

A delta database (e.g., of delta databases 94(1)-94(X)) tracks the delta (or difference) between the IGP metrics in two SPTs rooted at different nodes. Each delta database belongs to a failover policy group. The two SPTs being tracked in the delta database are associated with the same policy group to which the delta database belongs. The two SPTs are included in a sequence of SPTs defined by the policy group. One SPT is rooted at the currently active root node and the other SPT is rooted at a backup root node. Because all SPTs in a failover policy group consist of the same group of nodes, the delta database may be separate from the SPT database and only one delta database may be required.

In some embodiments, a delta database can track the difference of the IGP metrics between each node in two SPTs. In other embodiments, a delta database can track the difference of the IGP metrics of interfaces of the nodes in the two SPTs. This may be desirable because some clients of an SPF computation process, such as BGP-ORR, may be interested in the IGP metrics of the interfaces of the nodes, rather than the IGP metrics of the nodes themselves. In at least one embodiment, all interfaces (or statically configured routes) attached to an IGP node, which is learned via routing protocol packets (e.g., LSAs, LSPs), can inherit the cost of the IGP nodes.

In node 50, stored data may include a routing information base (RIB) table 51 that includes routing information to enable node 50 to route network traffic within autonomous system AS1 and possibly to external destinations. In particular, RIB table 51 may contain best path information for network address prefixes, after the best paths are selected and advertised by node 30. Contents of RIB table 51 can depend, at least in part, on its location within autonomous system AS1. For example, routing information may vary based on a cluster of routers to which a node is assigned. A best path for a particular prefix stored in a router of one cluster may vary with respect to a best path for the same prefix stored in another router of another cluster in the same autonomous system.

Figure 3:
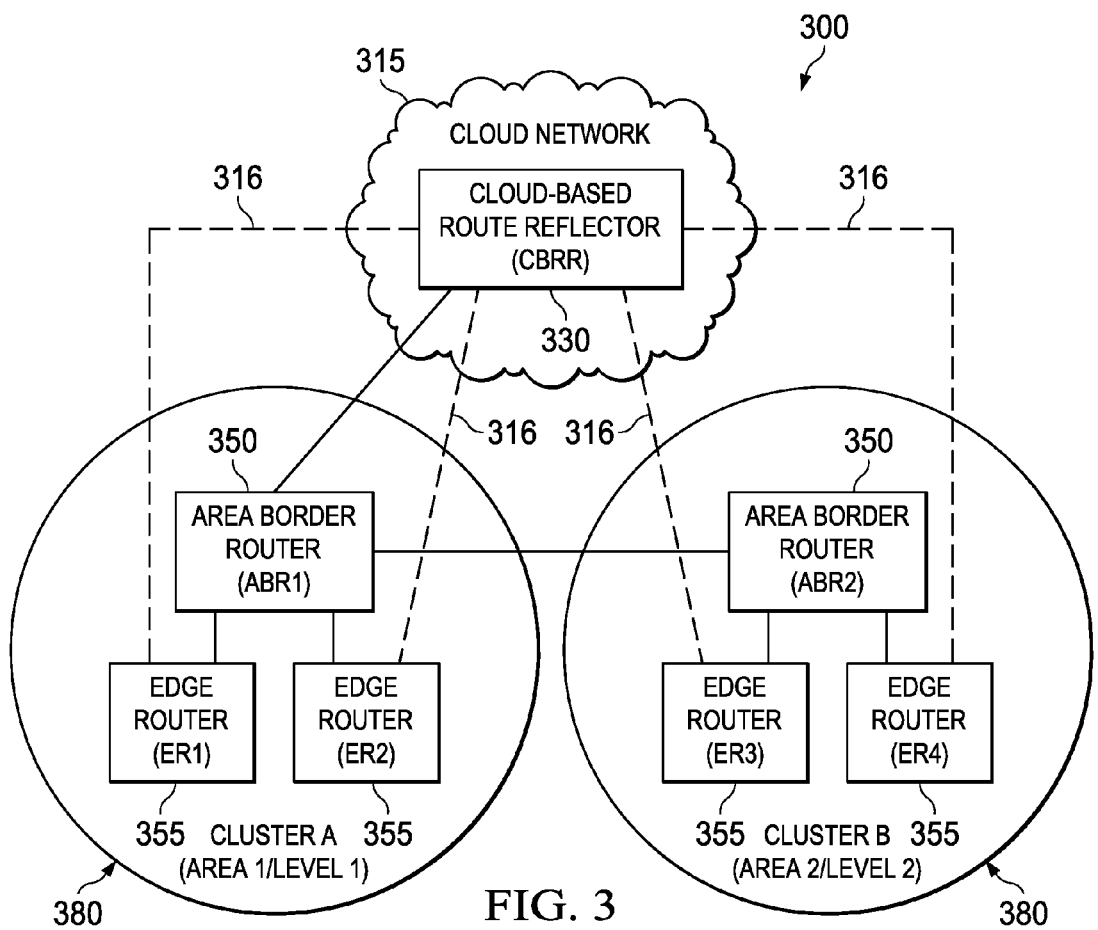
FIG. 3 is a simplified block diagram of a possible configuration of a communication system according to at least one embodiment.

FIG. 3 is a block diagram illustrating a possible configuration of a communication system 300 for providing automatic ORR root address assignment to route reflector clients, fast failover and TLV extensions capabilities in an autonomous system. In at least some embodiments, communication system 300 is an example of a possible configuration of communication system 100. Nodes (e.g., 330, 350, 355) in communication system 300 are provisioned as an autonomous system, which defines a distinct routing domain. Nodes in the autonomous system are partitioned into two clusters 380 (e.g., cluster A and cluster B). The nodes in cluster A include an area border router 350 (e.g., ABR1) and edge routers 355 (e.g., ER1 and ER2). The nodes in cluster B include another area border router 350 (e.g., ABR2) and other edge routers 355 (e.g., ER3 and ER4). In the embodiment of FIG. 3, edge routers ER1, ER2, ER3, ER4, and area border routers ABR1 and ABR2 are clients of CBRR 330 and each one can establish a connection or BGP session 316 (e.g., TCP connection) with CBRR 330 in order to speak BGP.

Edge routers 355 may represent autonomous system border routers (ASBRs), customer edge routers (CEs), provider edge routers (PEs), a point of presence (POP), and any other node provisioned at an edge, or perimeter, of the autonomous system that can be an egress point and participate in BGP sessions with CBRR 330 in cloud network 315. Other nodes (not shown), such as internal routers (or interior nodes), may also be provisioned in the clusters. Generally, area border routers 350 and edge routers 380 can be configured in the same or similar manner to node 50, and CBRR 330 can be configured in the same or similar manner as node 30.

Area border routers ABR1 and ABR2 represent routers located near a border of one or more areas or levels of an Interior Gateway Protocol (IGP). IGPs are routing protocols for exchanging routing information among routers within an autonomous system for internal destinations. Examples of IGP include Open Shortest Path First (OSPF) and Intermediate System-to-Intermediate System (IS-IS). In communication system 300, each cluster may have its own IGP domain (e.g., an area for OSPF or a level for IS-IS). Generally, an area/level of an IGP is a routing group of an autonomous system that can be smaller than the autonomous system. In at least some embodiments, IGP routing groups correspond to clusters of communication system 300. In other implementations, however, clusters may not have one-to-one correspondence with routing groups. ABR1 and ABR2 can each provide an ingress and egress point for network traffic flowing to nodes within their respective routing groups or flowing from their respective routing groups to nodes in other routing groups within the autonomous system. In some implementations, however, IGP may have a single flat area. For ease of illustration, in this example, clusters A and B correspond to distinct IGP routing groups. Thus, ABR1 and ABR2 can perform data path forwarding between clusters A and B in this example. In addition, in this example, ABR1 and ABR2 are selected by CBRR 330 as root nodes of their respective clusters A and B.

IGP neighbors (two routers with a common link) may form an adjacency to exchange routing protocol packets. A routing protocol packet communicated by a router can contain the router's local routing topology including for example, a router ID, the router's IP address, links to other routers within the router's area, and route metrics for each of the links. Link state advertisements (LSAs) and link state packets (LSPs) are routing protocol packets that are used to communicate in OSPF and IS-IS, respectively. For ease of illustration, embodiments described herein generally refer to 'link state advertisements' (or 'LSAs') and 'areas', which are used in OSPF. It will be apparent however, that the embodiments disclosed herein can be applied to any other suitable IGPs including, but not limited to IS-IS. In IS-IS, routing protocol packets are referred to as 'link state packets' (or 'LSPs'), and routing groups are referred to as 'levels'.

In an IGP, each router has its own unique router ID. By way of example, OSPF can set a router ID by configuring an IP address on a loopback interface of the router. In IS-IS, the router ID (or system ID) can be configured by an administrator in various suitable ways (e.g., IP address of loopback interface, Media Access Control (MAC) address, sequential numbering, etc.).

Routers in an autonomous system may be partitioned into areas in which the routers exchange LSAs. For example, each router in an area announces, in the area, all of its interface information. A designated router (e.g., ABR1 and ABR2) may send and receive LSA updates from other routers in the same autonomous system. In FIG. 3, ABR1 and ABR2 may send LSA packets of their respective areas to CBRR 330.

In the example configuration of FIG. 3, clusters A and B are mapped to two different areas. A first area (e.g., area 1) corresponds to cluster A and includes ABR1, ER1 and ER2. A second area (e.g., area 2) corresponds to cluster B and includes ABR2, ER3 and ER4. In OSPF, an area 0 (not shown) may be provided as a backbone through which area 1 and area 2 communicate to each other and to CBRR 330. In one example, each router in an area sends an LSA announcing its reachability, to the ABR in the area. An ABR can send the LSAs of all the routers in its area to CBRR 330. In one implementation, CBRR 330 may establish a tunnel to each ABR and establish the same protocol to receive the LSAs for the respective areas. In another implementation, an ABR may put all of its IGP information into a BGP packet and send it to CBRR 330 via BGP. It should be apparent, however, that any other suitable techniques for communicating data could be employed to send the routing topology information from the areas to CBRR 330.

Cloud-based route reflector (CBRR) 330 includes route reflection capabilities. Edge routers ER1, ER2, ER3, and ER4 and area border routers ABR1 and ABR2 are route reflector clients (RR-clients) of CBRR 330. CBRR 330 may be a virtual or physical router in cloud network 315. CBRR 330 is not in the forwarding path of the autonomous system and therefore, can run BGP-ORR 60 with root selection logic 64 and optimized best path selection logic 62 and be configured to receive and send control plane information only.

In operational terms, and in terms of one particular embodiment, IGP can advertise router information to CBRR 330 for each node in the autonomous system (e.g., ABR1, ABR2, ER1, ER2, ER3, and ER4). CBRR 330 can identify ER1, ER2, and ABR1 as RR-clients and can group them in cluster A. CBRR 330 can identify ER3, ER4, and ABR2 as RR-clients and can group them in cluster B. Various approaches may be utilized to group the nodes into clusters including, for example, manually configuring the clusters or using information from existing protocols (e.g., BGP, IGP) to identify clients and group the clients into clusters. In at least some embodiments, a cluster identifier, which is a BGP attribute, may be used by CBRR 330 to determine which nodes are in the same cluster. In other embodiments, clusters can correspond to IGP areas (or levels) and thus, clusters can be configured based on an IGP area membership. In yet further embodiments, clusters may be manually configured.

In at least one embodiment, clusters are formed and root nodes can be automatically selected by CBRR 330. In this embodiment, an optimal route reflector root list is initially created. CBRR 330 identifies ABRs to be added to a candidate root list by checking for their participation in both level 1-2 Intermediate System to Intermediate System (IS-IS) topology or participation in both area 0 and another area in an Open Shortest Path First (OSPF) topology. While an optimal route reflector root (ORR root) is an IGP router, it can be identified by an interface address of the router as this is a common identifier between IGP and BGP. When an LSA is sent to CBRR 330, CBRR 330 may determine whether the interface address is already in its interface database (e.g., interface database 98) and if so, if it is not being announced by a different IGP node than what is already in its database. This error checking is performed to ensure that multiple spanning trees (SPTs) are not rooted at the same IGP node. The node can be identified as an ABR if the node was announced previously in another LSA for a different area. In at least one embodiment, this identification can be made based on a unique identifier (e.g., router ID) of the node in both LSAs. The LSAs may contain different interfaces of the node if different interfaces are being announced in different areas. In other, potentially less common scenarios, the LSAs may contain the same interface of the node if the same interface is being announced in different areas.

Root nodes may also be selected using alternative techniques. For example, it is possible to introduce a new IGP type-length-value (TLV) element that is configured to mark a node to be a potential root for a given IGP area. Alternatively, a new BGP extended community could be used to identify a node as an ORR root. Extended community is an attribute of a BGP route and could be used to indicate an address of an ABR as an ORR root. This identification could occur via configuration at the candidate IGP node. In at least one embodiment, this explicit candidate ORR root can override any implicit ORR roots for that IGP area.

An RR-client may be associated to an ABR if the ABR in the same area is identified as an ORR root. An RR-client can be identified by its BGP neighbor address. In most cases, the BGP neighbor address is its loopback address. The RR-client neighbor address is then mapped to its IGP link state advertisement (LSA) to resolve the IGP LSA's area identifier (area ID). Consequently, an RR-client neighbor address is bound to an IGP area and an IGP area ID. The same logic can be applied to ABR addresses. All the ABRs with same area ID as the RR-client's area ID can be candidate ORR root addresses.

In cases where there are multiple candidate roots, many algorithms can be used for selection of a primary root address. An example algorithm involves CBRR 330 computing the distance of the RR-client from each candidate ORR root and associating it with the ABR with the shortest distance. In cases where the candidate ORR root list is long, an IGP TLV extension may be used to mark a node to be a potential root for a given IGP area, as previously described herein. Alternatively, an operator can be presented with a complete ORR root list and prompted to prune it. In at least some implementations, an operator can override the CBRR's auto association of RR-clients via configuration.

Finally, a backup spanning tree (SPT), or a sequence of backups, can also be selected based, at least in part, on the distance of the RR-clients from each ORR root. An additional constraint in the selection algorithm of backup SPTs is the depth of the primary ORR root in the backup SPT. A backup SPT that has the primary ORR root as a leaf node may be desirable because, if the primary ORR root fails, the backup SPT does not need to be recomputed and can immediately become the new primary SPT.

Figure 4:
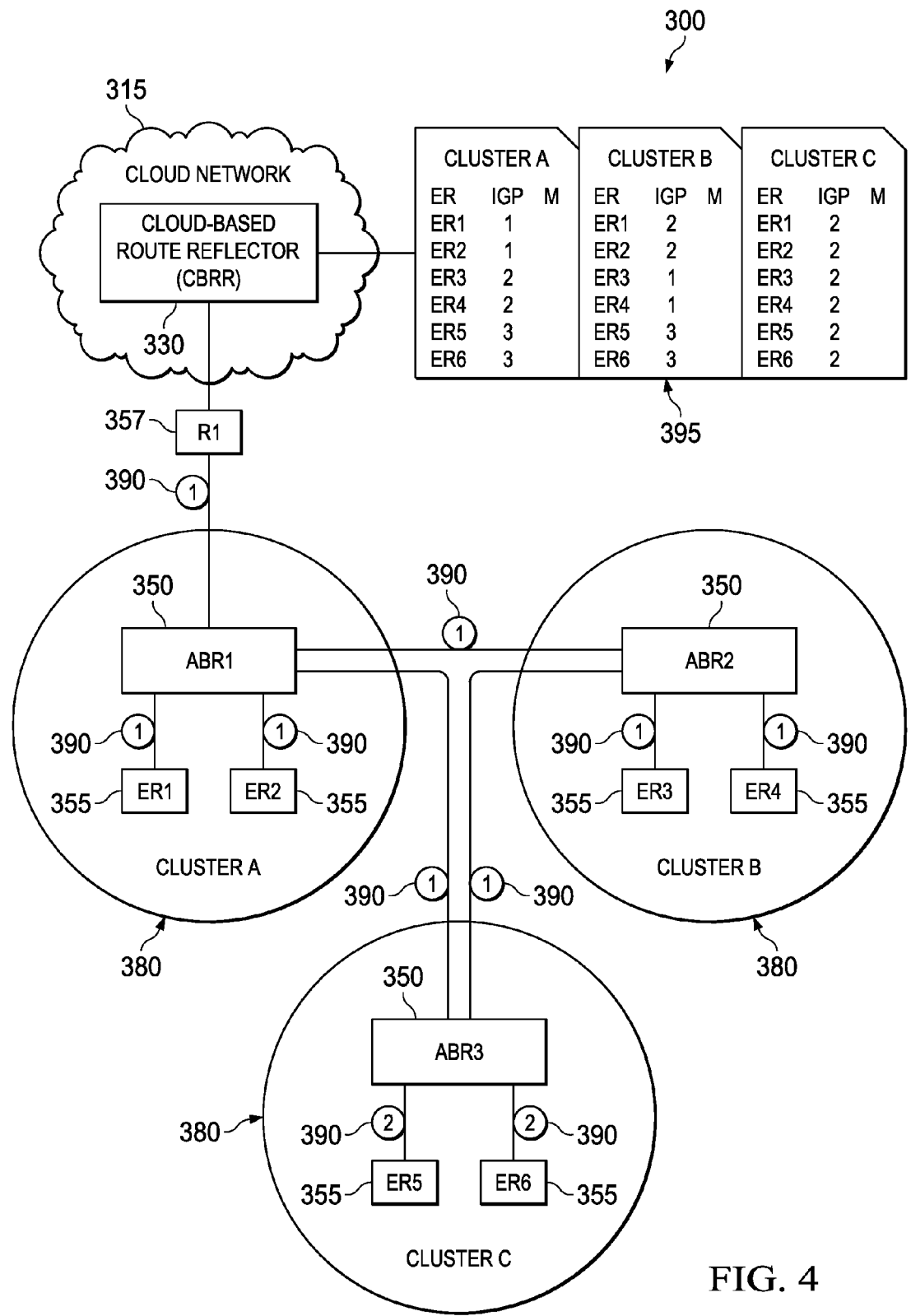
FIG. 4 is a simplified block diagram illustrating the communication system of FIG. 3 with additional possible elements according to at least one embodiment.

FIG. 4 is a simplified block diagram illustrating additional elements and clusters of communication system 300. As shown in FIG. 4, communication system 300 may further include additional nodes partitioned in a third cluster 380 (e.g., cluster C). Cluster C includes an area border router 350 (e.g., ABR3) and edge routers 355 (e.g., ER5 and ER6). Other nodes (not shown), such as interior routers, may also be provisioned in cluster C. Communication system 300 may further include a node embodied as a router 357 (e.g., R1) between cloud-based route reflector (CBRR) 330 and ABR1.

Additional elements are shown in FIG. 4 including an optimal route reflector routing information base (ORR RIB) table 395, which can be maintained by CBRR 330. In at least one embodiment, ORR RIB table 395 may include routing information associated with prefixes of external network addresses. This routing table can be populated by routing information that is advertised by edge nodes ER1-ER6 in communication system 300. In at least one embodiment, ORR RIB table 395 can include the routing information per cluster for every cluster in the autonomous system.

Routing information in ORR RIB table 395 may also include, but is not limited to, router IDs and IGP metrics (e.g., cost, distance) that enable optimum path selection for RR-clients (e.g., ER1-ER6) of CBRR 330. The IGP metrics stored in ORR RIB table 395 may be measured from a root node of a cluster (e.g., ABR1, ABR2, ABR3) to an RR-client within the cluster (e.g., ER1-ER6). Example IGP metrics for each hop between nodes in communication system 300 are indicated at 390. IGP next hop costs 390 are used to calculate IGP metrics that are stored in ORR RIB table 395. For example, as shown in Cluster A, information of ORR RIB table 395, the costs from ABR1 to ER1 and to ER2 are 1 each, because each path traverses one hop having a cost of 1. The costs from ABR1 to ER3 and to ER4 are 2 each, because each path traverses two hops and each hop has a cost of 1. The costs from ABR1 to ER5 and to ER6 are 3 each, because each path traverses two hops, where one hop has a cost of 1 and the other hop has a cost of 2.

Figure 5A:
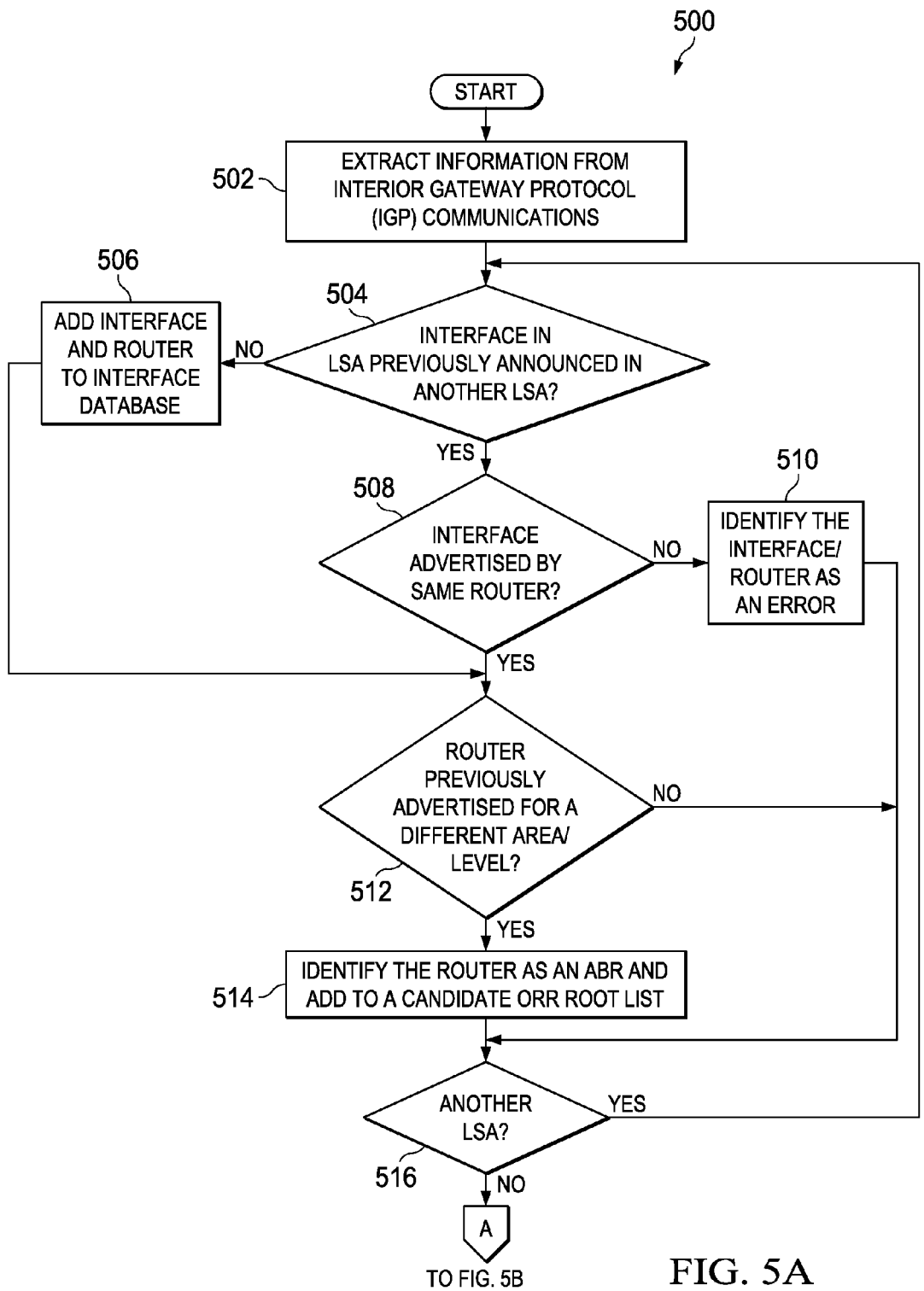
FIGS. 5A-5B show a simplified flowchart illustrating potential operations associated with a communication system according to at least one embodiment.
Figure 5B:
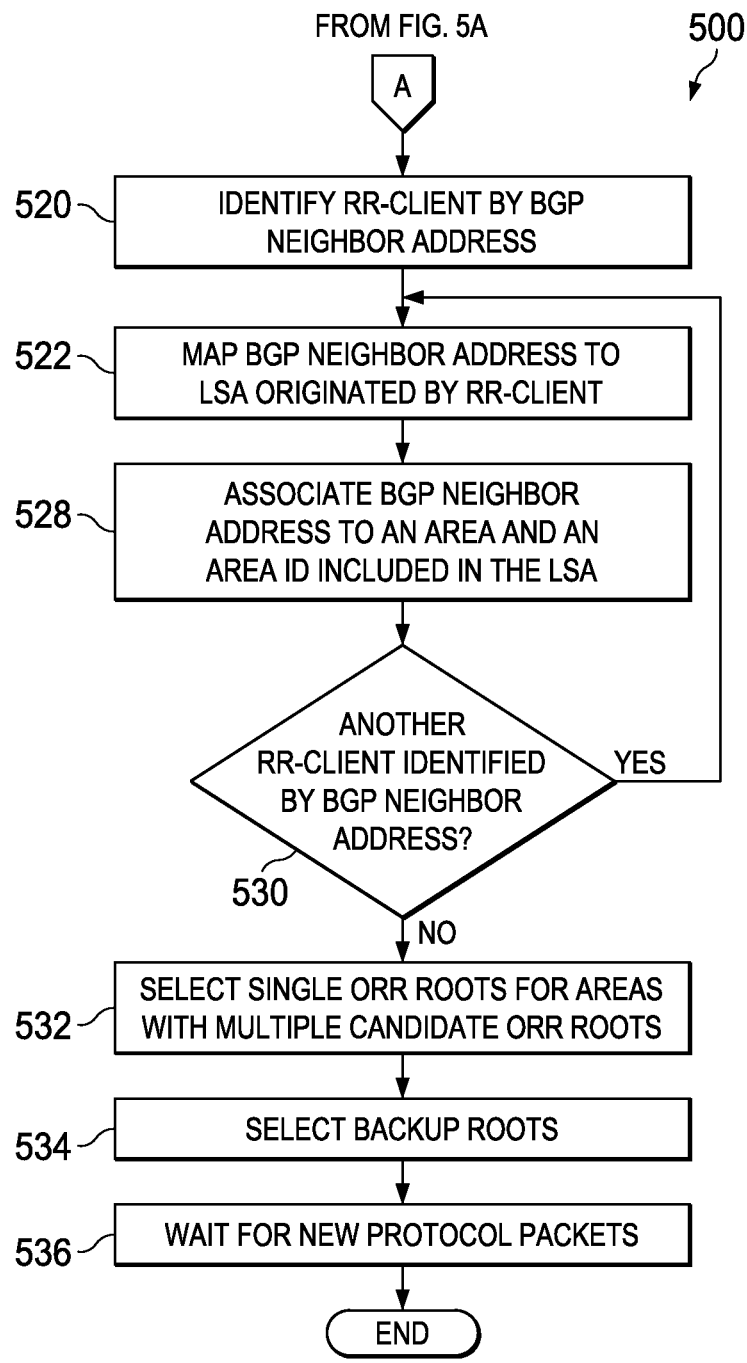

Turning to FIGS. 5A-5B, FIGS. 5A-5B show a flowchart of a possible flow 500 of operations that may be associated with embodiments described herein for automatically assigning optimal route reflector root addresses to route reflector clients. In at least one embodiment, one or more sets of operations correspond to activities of FIGS. 5A-5B. A cloud-based route reflector (e.g., 30, 330) may utilize the one or more sets of operations. The cloud-based route reflector may comprise means, such as at least one processor (e.g., 39), for performing the operations. In an embodiment, at least some operations of flow 500 may be performed by root selection logic (e.g., 64) of a border gateway protocol optimized route reflector (e.g., 60) in the cloud-based route reflector. For ease of illustration, FIGS. 5A-5B are discussed below with reference to communication system 300 illustrated in FIG. 4.

At 502, CBRR 330 extracts information from IGP routing protocol packets within communication system 300. In at least one embodiment, the information can be extracted from link state advertisements (LSAs) or link state packets (LSPs) generated by RR-clients of communication system 300. In one example, tunnels may be established between CBRR 330 and area border routers of the particular IGP domains (e.g., OSPF areas or IS-IS levels) implemented in communication system 300. An adjacency can be established in IGP between CBRR 330 and each one of ABR1, ABR2, and ABR3. LSAs generated by routers within a particular area can be communicated to CBRR 330 from the ABR of that area. In another example, the ABR can put its IGP information (for itself and the other routers within its area) into a BGP packet, which can be forwarded to CBRR 330. Furthermore, any other suitable techniques for communicating data (e.g., file transfer protocol, etc.) may be used to communicate routing information for the IGP domains to CBRR 330.

In at least one embodiment, the Internet Protocol (IP) addresses that are advertised in IGP routing protocol packets are already configured as RR-clients in CBRR 330. For example, IP addresses of ER1-ER6 and ABR1-ABR3 may be configured as RR-clients by CBRR 330. CBRR 330 uses IGP information (e.g., from LSAs, LSPs, etc.) to identify possible (candidate) ORR roots and to associate RR-clients to ORR roots. Initially, candidate ORR roots can be identified by evaluating router and area information contained in the routing protocol packets for each router. Interface information contained in the routing protocol packets may also be evaluated in at least some embodiments. Routers may contain multiple interfaces for multiple physical network connections.

In at least one embodiment, operations 504-516 may be performed for each routing protocol packet (e.g., LSA, LSP, etc.) that is received. For ease of illustration, 'LSA' is used herein to describe operations of FIGS. 5A-5B. It will be apparent, however, that this logic can be applied to other routing protocol packets (e.g., LSPs, etc.) of other routing protocols (e.g., IS-IS, etc.).

At 504, a determination can be made as to whether an interface of a router that is advertised in an LSA was previously announced in another LSA. In one example, this determination may be made based on an IP address of the interface and whether the IP address exists in an interface database (e.g., interface database 98) of CBRR 330. If the IP address does not exist in the interface database, then at 506, the IP address and an identification of the associated router (e.g., router ID) can be added to the interface database.

If it is determined at 504, that the interface already exists in the interface database of CBRR 330, then a determination may be made at 508, as to whether the interface (e.g., IP address of the interface) was previously advertised in an LSA originating from the same router. This determination can be based on the router ID of the router, which is included in the LSA. If it is determined that the interface was not previously advertised by the same router (i.e., interface was previously advertised by a different router), then an error can be identified because multiple routers cannot be associated with the same IP address of an interface. Flow can continue at 516, where a determination can be made as to whether another LSA is to be evaluated and if so, processing for the other LSA can begin at 504.

If it is determined at 508, however, that the interface was previously advertised in another LSA originating from the same router, or if it is determined at 504 that the interface in the LSA was not previously announced in another LSA, then flow can pass to 512. At 512, a determination can be made as to whether the router was previously advertised for a different area (e.g., area 1, area 2, etc. or level 1, level 2, etc.). When an autonomous system is partitioned into multiple areas, each router that advertises its IP address in an LSA may be associated with an area identifier (area ID). This area ID can be included in the LSA advertised by the router. An ABR in a particular area can receive LSAs from other routers in the area and can communicate the LSAs to other ABRs in other areas and to CBRR 330. In OSPF, ABRs can participate in multiple areas (e.g., ABR1 may participate in area 1 and area 0), and therefore, an ABR may communicate LSAs for each area in which it participates. Thus, CBRR 330 may receive one LSA from an ABR that includes area 1, and another LSA from the same ABR that includes area 0 in its header. Determining whether the same router is advertised in different LSAs for different areas can be based on the router ID in the LSAs. It should be noted that a similar evaluation can be done when other routing protocols are implemented. For example, in IS-IS, ABRs can participate in multiple levels and LSPs can be evaluated to determine whether the same router is advertised in different LSPs for different levels.

If the router indicated in the LSA was previously advertised for the same area or level, as determined at 512, then the router may not be an ABR and therefore, is not identified as a possible ORR root. Flow can continue at 516, where a determination can be made as to whether another LSA is to be evaluated and if so, processing for the other LSA can begin at 504.

However, if the router was previously advertised for a different area as determined at 512, then at 514, the router can be identified as an ABR and added to a candidate ORR root list. In at least one embodiment, an identifier of the ABR (e.g., router ID, IP address) may be added to a list of potential ORR roots. Flow can continue at 516, where a determination can be made as to whether another LSA is to be evaluated and if so, processing for the other LSA can begin at 504. Processing may continue for all LSAs received by the CBRR.

Typically, when a router is advertised in multiple LSAs for different areas (or multiple LSPs for different levels), different interfaces are included in each LSA. For example, consider router A with two interfaces, I0 and I1. If I0 is an interface for area 0 and I1 is an interface for area 1, then one LSA may be generated to announce router A, I0, and area 0, and another LSA may be generated to announce router A, I1, and area 1. The LSAs can include the same router ID for router A. Thus, router A can be identified as a possible ORR root candidate for area 1 (and possibly for area 0). In some configurations, however, the same interface of a router may be advertised for two areas. For example, consider router B with one interface I2 for area 0 and area 1. An LSA could be generated to announce router B, I2, and area 0, and another LSA could be generated to announce router B, I2, and area 1. In this scenario, router B can be identified as a possible ORR root candidate for a area 1, for example.

If a determination is made at 516 that there are no more LSAs to be evaluated, then operations at 520-530 may be performed to associate RR-clients to ABRs. In at least one embodiment, this association may be based on areas partitioned in the autonomous system and BGP neighbor addresses of RR-clients, including ABRs. The routing information in ORR RIB table 395 can include BGP neighbor addresses of the RR-clients. In at least some embodiments, a BGP neighbor address of an RR-client can be the same as an IGP interface address advertised in an LSA packet from the RR-client (e.g., loopback address of the RR-client).

At 520, CBRR 330 identifies an RR-client by its BGP neighbor address, for example, in RIB table 395. At 522, the BGP neighbor address is mapped to an LSA (or information from the LSA) originated by the RR-client. The LSA packet can include an area ID assigned to the RR-client that originated the LSA. Therefore, at 528, the BGP neighbor address of the RR-client can be associated with the IGP area and area ID. Both ABRs and other RR-clients can be associated with an IGP area and area ID. ABRs that are associated with the same area ID as other RR-clients are now candidate root nodes for those other RR-clients.

At 530, if another RR-client is identified by its BGP neighbor address, then flow passes back to 522 to map the BGP neighbor address to an LSA and resolve an area and area ID for the BGP neighbor address. However, if it is determined at 530, that no more RR-clients have been identified, then at 532, a single root is selected for each area that has multiple candidate root nodes (e.g., an area containing multiple ABRs). Various techniques may be used to identify a single ORR root from a list of candidate root nodes. An example algorithm can be used to compute the distance of a particular RR-client from each candidate ORR root. The ABR having the shortest distance to the RR-client can be selected as the ORR root of the particular area. In some embodiments, if RR-client load information is known, the RR-client (or group of RR-clients) having the largest load could be used to determine the candidate root node having the shortest path to that RR-client (or group of RR-clients). Other techniques may alternatively be used to select a candidate root node as the ORR root for a particular area. For example a candidate root node having the lowest or highest IP address (or other identifier) may be selected as the ORR root. In another example, an IGP TLV extension may be used to mark a node to be a potential root for a given IGP area, as previously described herein. In another embodiment, an operator can be presented with full ORR root list and prompted to prune it. Finally, an operator can override the CBRR's auto association of RR-clients via configuration.

After a single ORR root is selected, at 534, one or more backup ORR roots may be selected. For each backup ORR root, a spanning tree can be computed and stored (e.g., spanning trees database 92). The backup ORR roots may be determined in the same manner as the primary ORR root is determined. Distance to a backup candidate ORR root (e.g., another ABR) from an RR-client, an IGP TLV extension, operator input, and/or operator override via configuration may be used separately or in some combination thereof. Additionally, certain policies may also be considered. For example, a desirable backup could be an ORR root that results in an SPT with the primary ORR root as a leaf node.

In this scenario, if the primary ORR root fails, an SPT for the backup ORR root does not have to be recomputed and can immediately become the primary SPT with the backup ORR root.

Finally, once all of the areas have been configured with an ORR root and one or more backup ORR roots, then at 536, CBRR can wait for new routing protocol packets (e.g., LSAs or LSPs). New routing protocol packets can provide updated routing information to CBRR 330, which can be used to update associations between RR-clients, ABRs and areas.

Type-Length-Value Elements for Interior Gateway Protocols

Certain functionality may be desirable in embodiments disclosed herein. Interior Gateway Protocols (IGPs) may be customized according to at least some embodiments, to provide the desired functionality. IGPs such as Open Shortest Path First (OSPF) and Intermediate System to Intermediate System (IS-IS), as previously described herein, may be provided with customized type-length-value elements to enable certain functionality.

A first functionality that may be desirable in at least some embodiments relates to the capability of a cloud-based route reflector (e.g., node 30, CBRR 330). CBRR 330 is not in the forwarding path and, therefore, CBRR 330 is configured to receive and send control plane traffic, but not data plane traffic. IGPs, however, do not accommodate a leaf node where the node needs to participate in routing for its reachability, but is not capable of acting as a forwarder for data traffic. Instead, IGPs can support hidden nodes and maximum metrics. For example, an LSA could announce a router as a maximum metric, which indicates the router is not to be used for forwarding purposes except as a last preference. Participation in the control plane by nodes without forwarding capabilities, however, may be needed in embodiments disclosed herein that provide optimal route reflector root address assignment to route reflector clients and fast failover capabilities.

At least one embodiment of the present disclosure can resolve aforementioned issues (and more) associated with a node (e.g., leaf node) that is incapable of forwarding but needs to participate in routing for reachability purposes. Embodiments disclosed herein allow a CBRR to 1) announce its reachability information in IGP, for example, for BGP session management, and 2) explicitly indicate that the announced reachability information is not to be used for forwarding purposes. Embodiments are not directed to a path of least preference or a node that is hidden within an IGP topology. The reachability information that is announced is information to be used to communicate with the CBRR via the transport layer. The reachability information that is announced is not to be used to forward packets to a destination other than the CBRR. Although embodiments disclosed herein are directed to optimal cloud-based route reflection functionalities, it should be apparent that these embodiments can be extended to any cloud-based router that is incapable of forwarding, but that needs to be part of the control plane.

In at least one embodiment, routers can be configured to carry an additional type-length-value (TLV) element configured for a particular protocol being used (e.g., IS-IS, OSPF, etc.). Generally, a TLV element of a packet includes a Type field that indicates the type of items in a Value field, a Length field that indicates the length of the Value field, and a Value field that is the data portion of the packet. A new sub-TLV (type-length-value) within an IS-IS router capability TLV may be defined using any suitable values, which may configured based on particular implementations and/or needs. In at least one embodiment, however, the new sub-TLV could be defined as follows:

TABLE 1

IS-IS

| Field | Bytes | Values |
|---|---|---|
| Router Capability TLV | 1 | 242 |
| Length | 1 | 7 |
| Router ID | 4 | Router ID |
| Flags | 1 | Scope AS wide |
| SubTLV | 1 | 19 (non transit IS-IS router capability) |
| Length | 1 | |
| Value | | no bytes (no forwarding information and extensibility) |

In at least one embodiment for an OSPF version 2 (OSPFv2) protocol, a new OSPFv2 router information TLV (type-length-value) may be defined using any suitable values, which may configured based on particular implementations and/or needs. In at least one embodiment, however, the new TLV may be defined as follows:

TABLE 2

OSPFv2

| Field | Bytes | Values |
|---|---|---|
| TLV | 1 | 7 (non-transit OSPF router capability) |
| Length | 1 | 0 |
| Value | no bytes | (no forwarding information and extensibility) |

In at least one embodiment for an OSPFv3 protocol, a new OSPFv3 router information TLV (type-length-value) may be defined using any suitable values, which may configured based on particular implementations and/or needs. In at least one embodiment, however, the new TLV may be defined as follows:

TABLE 2

OSPFv3

| Field | Bytes | Values |
|---|---|---|
| TLV | 1 | 7 (non-transit OSPF router capability) |
| Length | 1 | 0 |
| Value | no bytes | (no forwarding information and extensibility) |

The new TLV elements provided for the non-transit OSPF router capability and the non-transit IS-IS router capability indicate that an IGP speaker is capable of participating in IGP but is not capable of acting as a transit router or forwarder. This indication can help ensure that the other IGP speakers in a domain do not select such a speaker as a transit node for any reachability information other than the ones advertised by the speaker itself. Also note that the value field may be encoded with the "Don't forward" information. In addition, the value field may be configured with 1 byte to provide extensibility. Extra bits can allow other information to be encoded such as, for example, selective forwarding information (e.g., information indicating that forwarding through CBRR should be allowed in certain scenarios).

Figure 6:
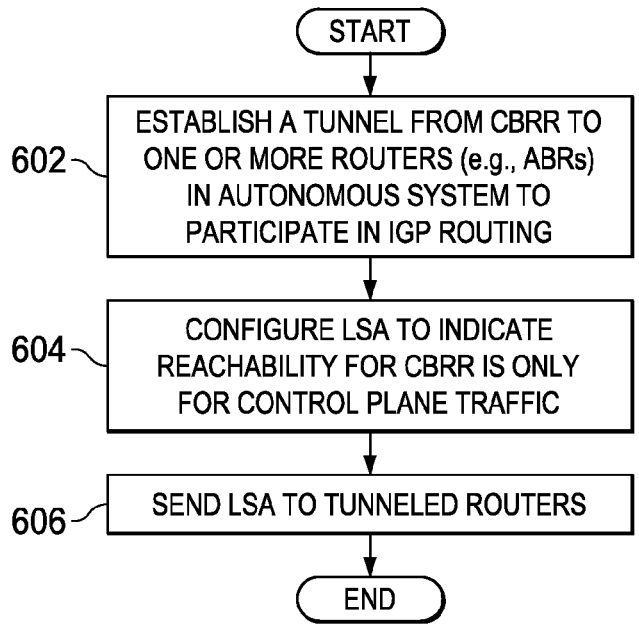
FIG. 6 shows a simplified flowchart illustrating potential operations associated with a communication system according to at least one embodiment.

FIG. 6 shows a flowchart of a possible flow 600 of operations that may be associated with embodiments described herein to enable a node, such as a CBRR, to participate in a control plane without providing forwarding capabilities. In at least one embodiment, one or more sets of operations correspond to activities of FIG. 6. A cloud-based route reflector (e.g., 30, 330) may utilize the one or more sets of operations. The cloud-based route reflector may comprise means, such as at least one processor (e.g., 39), for performing the operations. In an embodiment, at least some operations of flow 600 may be performed by a reachabililty extension originator (e.g., 72) of an IGP (e.g., 70) in the cloud-based route reflector. For ease of illustration, FIG. 6 is discussed below with reference to communication system 300 illustrated in FIG. 4.

At 602, CBRR 330 establishes a tunnel from CBRR 330 to one or more routers, such as ABR1-ABR3, to indicate that CBRR 330 wants to participate in IGP routing. At 604, CBRR 330 can configure an LSA to send to tunneled ABRs. The LSA can include a new TLV element indicating that reachability for CBRR 330 is only for control plane traffic, but not data plane traffic. The LSA may be sent to the tunneled routers (e.g., ABR1-ABR3) at 606. A reachability extension receiver (e.g., 82) of IGP (e.g., 80) of the tunneled routers can recognize the new TLV element and prevent data plane traffic from being forwarded to CBRR 330. Subsequently, CBRR 330 should receive only control plane traffic from the routers in communication system 300.

A second functionality that may be desirable in at least some embodiments relates to advertising originating router information in communication system 300. Typically, a root address is an area border router (ABR) for a given cluster or a client edge router itself (e.g., provider edge (PE) router). In a network that is partitioned into multiple routing groups (e.g., areas, levels), there is no way to associate a root address to a given client PE router because the ABR re-originates the routes as its own when announcing them to another routing group or to CBRR 330.

At least one embodiment of the present disclosure can resolve the aforementioned issues (and more) associated with advertising originating router information in a partitioned BGP-ORR network. In at least one embodiment, routers can be configured to carry an additional type-length-value (TLV) element configured for a particular protocol being used (e.g., IS-IS, OSPF, etc.). The additional TLV element in the routers may be configured to bind originating router information to re-originated link state advertisements (LSAs) or link state packets (LSPs). Information provided by the additional TLV element helps associate an LSA or LSP to its originating router. The association of an LSA or LSP to its originating router helps the CBRR to compute the SPF for a given root address.

A new sub-TLV (type-length-value) within an IS-IS router capability TLV may be defined using any suitable values, which may configured based on particular implementations and/or needs. In at least one embodiment, however, the new sub-TLV could be defined as follows:

TABLE 4

IS-IS

| Field | Bytes | Values |
|---|---|---|
| Router Capability TLV | 1 | 244 |
| Length | 1 | 7 |
| Router ID | 4 | Router ID |
| Flags | 1 | Scope AS wide |
| SubTLV | 1 | 19 (non transit IS-IS router capability) |
| Length | 1 | variable |
| Value | | Variable address field stating originating router ID |

In at least one embodiment for an OSPFv2 protocol, a new OSPFv2 router information TLV (type-length-value) may be defined using any suitable values, which may configured based on particular implementations and/or needs. In at least one embodiment, however, the new TLV may be defined as follows:

TABLE 5

OSPFv2

| Field | Bytes | Values |
|---|---|---|
| TLV | 1 | 9 (non-transit OSPF router capability) |
| Length | 1 | variable |
| Value | | Variable address field stating originating router ID |

In at least one embodiment for an OSPFv3 protocol, a new OSPFv3 router information TLV (type-length-value) may be defined using any suitable values, which may configured based on particular implementations and/or needs. In at least one embodiment, however, the new TLV may be defined as follows:

TABLE 6

OSPFv3

| Field | Bytes | Values |
|---|---|---|
| TLV | 1 | 9 (non-transit OSPF router capability) |
| Length | 1 | variable |
| Value | | Variable address field stating originating router ID |

The IGP router capability allows an original router ID to be preserved when IGP LSAs or LSPs cross area boundaries. Thus, embodiments disclosed herein allow a CBRR to work with multiple areas or levels (e.g., in a partitioned IGP) by providing sufficient information (e.g., via an additional TLV element) to associate LSAs or LSPs to their originating routers.

Figure 7:
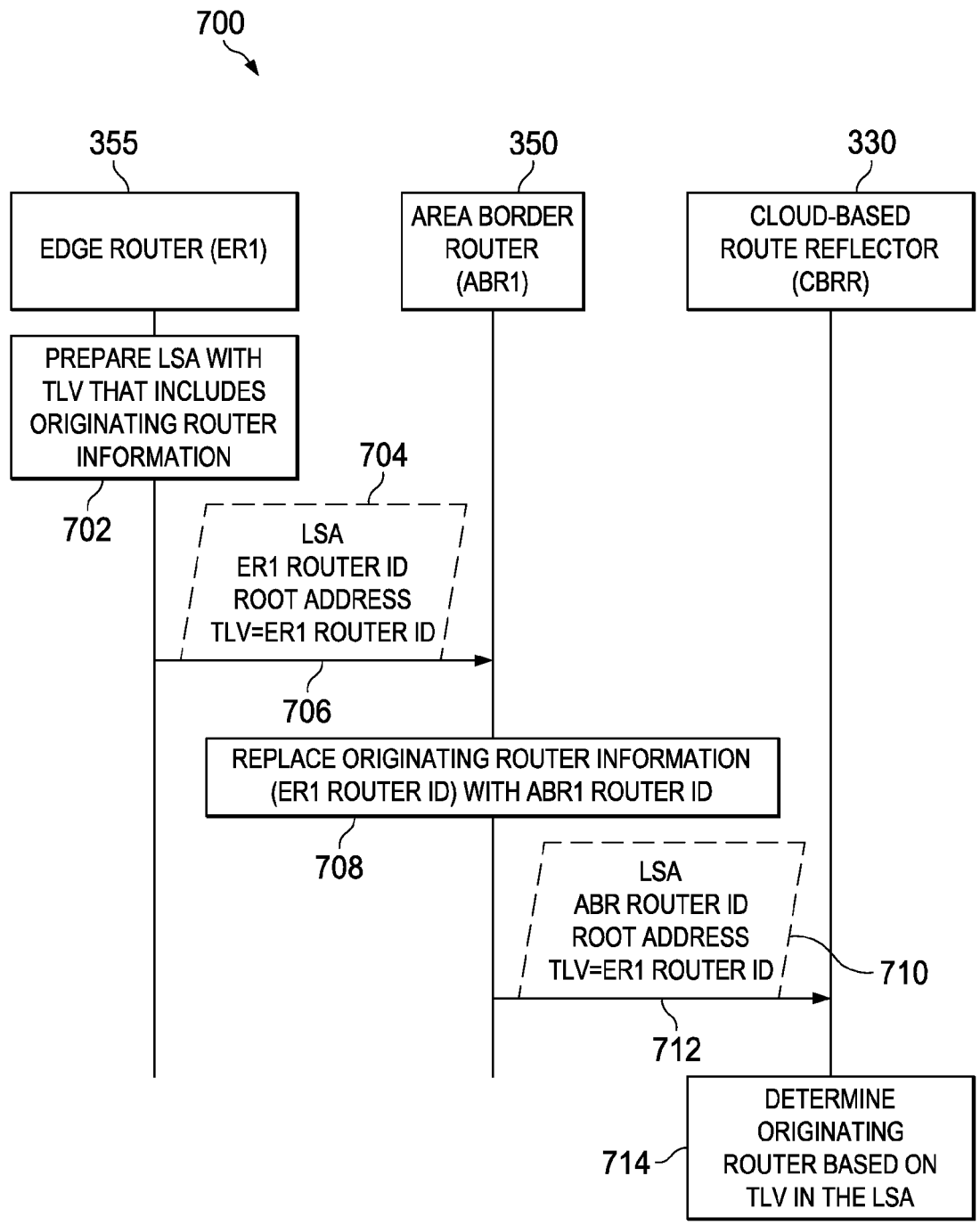
FIG. 7 is a simplified interaction diagram illustrating possible interactions in a communication system according to at least one embodiment.

FIG. 7 is an interaction diagram 700 illustrating possible interactions of selected components of communication system 300 that may be associated with embodiments described herein. For illustration purposes, the selected components include edge router 355 (ER1), area border router 350 (ABR1), and cloud-based route reflector (CBRR) 330. In at least one embodiment, one or more sets of operations correspond to interactions of FIG. 7. CBRR 330, ABR1, and ER1 may comprise means, such as at least one processor (e.g., 39, 59), for performing the operations. In an embodiment, at least some operations may be performed by an advertisement extension originator (e.g., 84) of IGP in ER1, and an advertisement extension originator (e.g., 74) of IGP in CBRR 330.

In the example scenario shown in interaction diagram 700, ER1 is an edge router (e.g., provider edge router) that is also a root node of cluster A. At 702, ER1 originates an LSA 704 to advertise its routing information to its neighbors within cluster A and to CBRR 330. LSA 704 includes, but is not necessarily limited to a router ID of ER1, a root address (e.g., IP address) of ER1, and a TLV element. The TLV element can include originating router information such as a router ID of ER1. During the interactions shown in FIG. 7, the router ID in the header of LSA 704 is replaced before LSA 704 reaches CBRR 330. The TLV element, however, is not altered and can provide this router ID information to CBRR 330.

At 706, LSA 704 is communicated to ABR1. In one example, LSA 704 may flood the nodes of cluster A. At 708, ABR1 receives LSA 704 and replaces the originating router information in the header of LSA 704 with a router ID of ABR1. A modified LSA 710 includes a router ID of ABR1, a root address of ER1, and the TLV element containing the router ID of ER1. At 712, modified LSA 710 is communicated to CBRR 330. At 714, CBRR 330 receives modified LSA 710 and identifies the originating router (e.g., ER1 in this scenario) based on the router ID contained in the TLV of the modified LSA 710.

Thus, modified LSA 710 is associated to its originating router. Because the originating router is the ORR root for cluster A in this example, this information enables CBRR 330 to compute SPF for the particular root address. Furthermore, providing this information enables CBRR 330 to work with multiple areas in a partitioned IGP network because LSAs from different areas are associated with their originating routers.

A third functionality that may be desirable in at least some embodiments relates to allowing an ORR root address as part of an Ethernet subnet in communication system 300. Typically, an ORR root address is an area border router (ABR) for a given cluster or the client edge router itself (e.g., provider edge (PE) router). In a network in which an ORR root address maps to an Ethernet subnet, there is no way to associate the root address to a given node. In IGP, Ethernet addresses may be advertised as subnets, which can map to multiple IP addresses. A subnet is a link with points at each end. The link endpoints each correspond to routers that are part of the subnet. When the routers are both candidate ORR root nodes, a CBRR has no way to determine which router to select as the ORR root.

Figure 8:
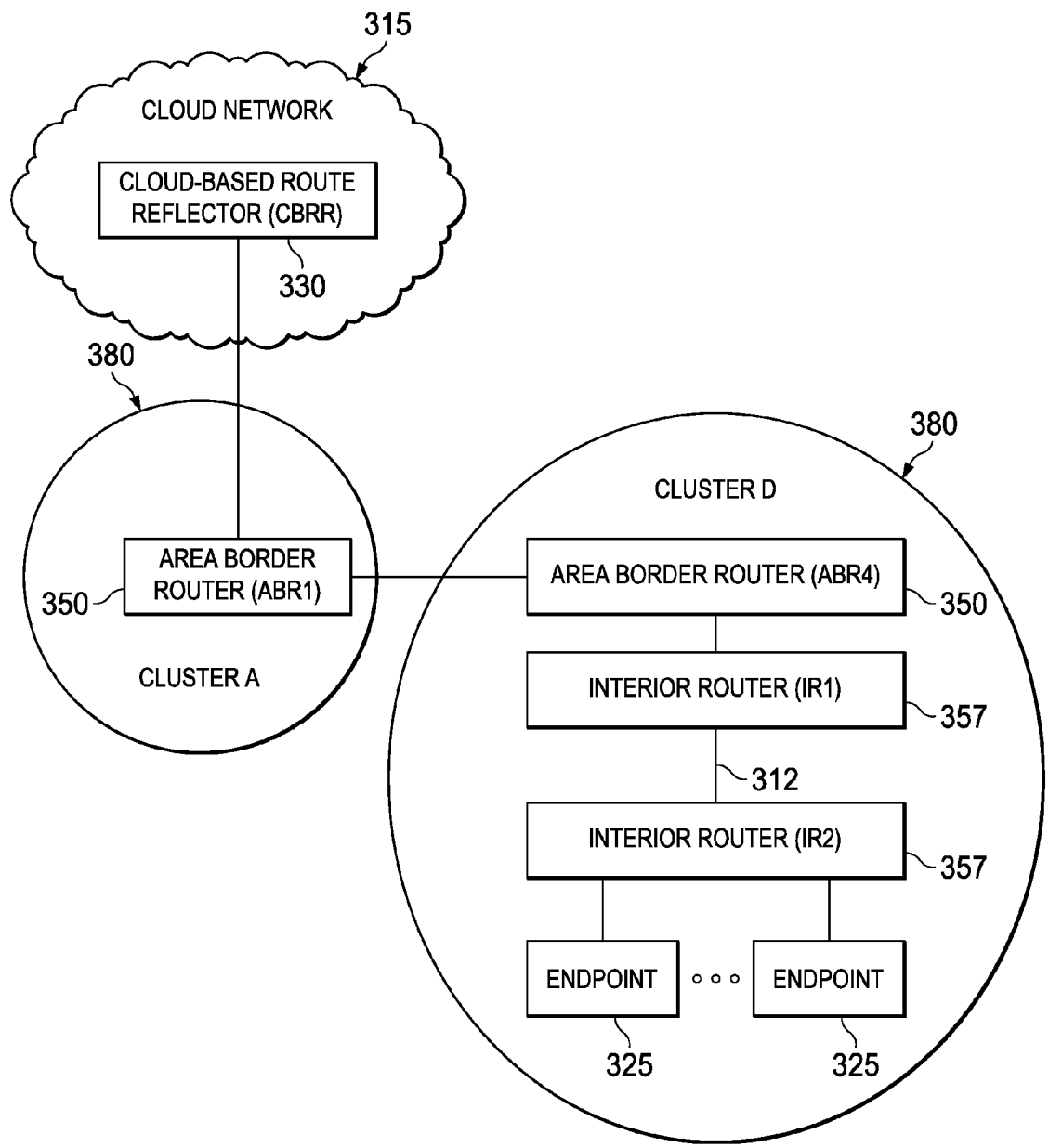
FIG. 8 is a simplified block diagram illustrating the communication system of FIG. 3 with additional possible elements according to at least one embodiment.

FIG. 8 is a simplified block diagram providing a partial representation of components of communication system 300, along with additional elements illustrating a subnet in a cluster. As shown in FIG. 8, communication system 300 may include additional nodes partitioned in a fourth cluster 380 (e.g., cluster D). Cluster D includes nodes such as an area border router 350 (e.g., ABR4) and interior routers 357 (e.g., IR1 and IR2). Other nodes (not shown), such as edge routers, may also be provisioned in cluster D. In at least one embodiment, interior nodes such as IR1 and IR2 may have the same or similar configuration as node 30.

In cluster D, IR1 and IR2 both have interfaces that map to a subnet 312. By way of example, subnet 312 could be represented as 1.1.1/24. IR1 could have an IP address of 1.1.1.10, and IR2 could have an IP address of 1.1.1.20, both of which map to subnet 312. When LSAs are communicated by IR1 and IR2 to advertise their routing information, each LSA identifies its router's IP address as 1.1.1/24. Thus, CBRR 330 cannot determine a root address to select and associate to a particular router as the ORR root.

At least one embodiment of the present disclosure can resolve the aforementioned issues (and more) associated with allowing an ORR root node as part of an Ethernet subnet in a BGP-ORR network. In at least one embodiment, existing IGPs can be extended to announce their locally configured addresses along with their link state advertisements (LSAs). To implement these announcements, existing routers can be configured to carry an additional type-length-value (TLV) element configured for a particular protocol being used (e.g., IS-IS, OSPF, etc.). Information provided by the additional TLV element can help associate an ORR root address, which is mapped to an Ethernet subnet, to a given node. Specific examples for augmenting existing IGP protocols are provided below.

A new sub-TLV (type-length-value) within an IS-IS router capability TLV may be defined using any suitable values, which may configured based on particular implementations and/or needs. In at least one embodiment, however, the new sub-TLV could be defined as follows:

TABLE 7

IS-IS

| Field | Bytes | Values |
|---|---|---|
| Router Capability TLV | 1 | 243 |
| Length | 1 | 7 |
| Router ID | 4 | Router ID |
| Flags | 1 | Scope AS wide |
| SubTLV | 1 | 19 (non transit IS-IS router capability) |
| Length | 1 | variable |
| Value |  | Variable address field stating local IP address on that subnet |

In at least one embodiment for an OSPFv2 protocol, a new OSPFv2 router information TLV (type-length-value) may be defined using any suitable values, which may configured based on particular implementations and/or needs. In at least one embodiment, however, the new TLV may be defined as follows:

TABLE 8

OSPFv2

| Field | Bytes | Values |
|---|---|---|
| TLV | 1 | 8 (OSPF router capability) |
| Length | 1 | variable |
| Value |  | Variable address field stating local IP addresses on that subnet |

In at least one embodiment for an OSPFv3 protocol, a new OSPFv3 router information TLV (type-length-value) may be defined using any suitable values, which may configured based on particular implementations and/or needs. In at least one embodiment, however, the new TLV may be defined as follows:

TABLE 9

OSPFv3

| Field | Bytes | Values |
|---|---|---|
| TLV | 1 | 8 (OSPF router capability) |
| Length | 1 | variable |
| Value |  | Variable address field stating local IP addresses on that subnet |

Embodiments disclosed herein provide IGP extensions to carry root address information. The OSPF router capability and the IS-IS router capability indicate that an IGP speaker is capable of announcing its locally configured Ethernet address, and can provide the address itself. This indication can help a CBRR identify a node at which SPF can be rooted. This extension to IGP enables host addresses to be associated with LSAs.

Figure 9:
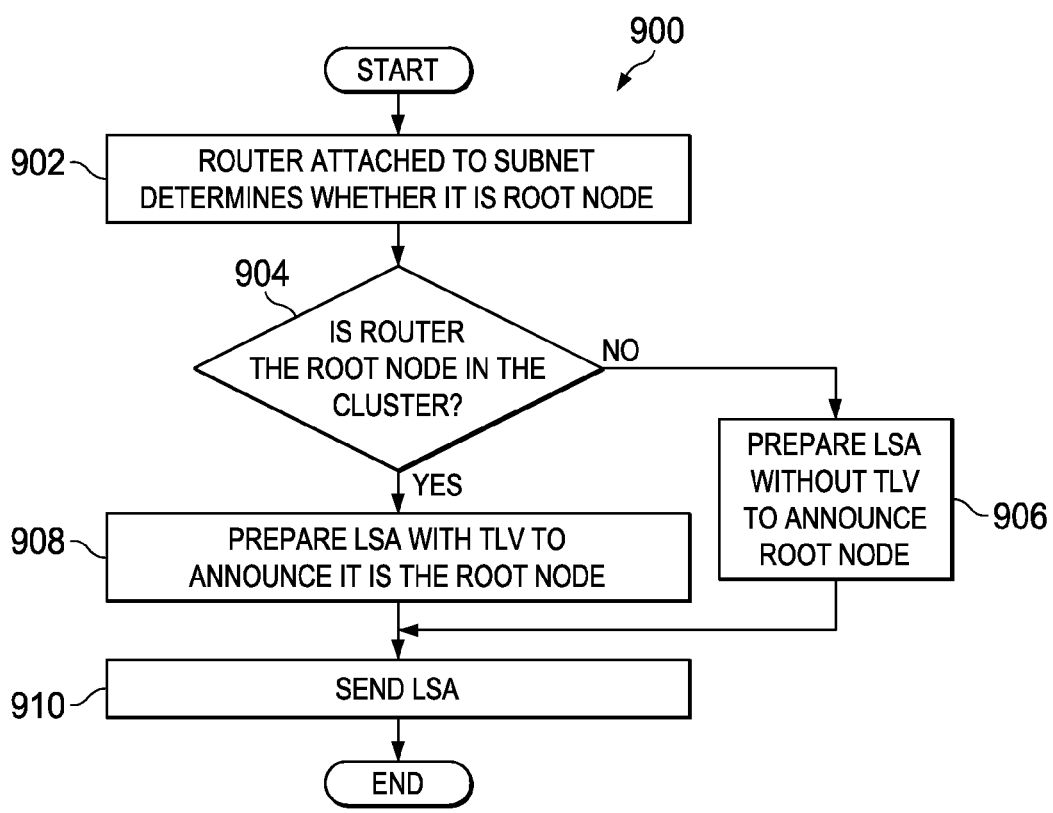
FIG. 9 shows a simplified flowchart illustrating potential operations associated with a communication system according to at least one embodiment.

FIG. 9 shows a flowchart of a possible flow 900 of operations that may be associated with embodiments described herein for allowing an ORR root address to be part of an Ethernet subnet. In at least one embodiment, one or more sets of operations correspond to activities of FIG. 9. A router (e.g., 20, 357) in an autonomous system may utilize the one or more sets of operations. The router may comprise means, such as at least one processor (e.g., 59), for performing the operations. In an embodiment, at least some operations of flow 900 may be performed by an Ethernet extension originator (e.g., 86) of IGP in the router. For ease of illustration, FIG. 9 is discussed below with reference to communication system 300 illustrated in FIG. 8, where IR1 is to be selected as the root node of Cluster D.

At 902, a router attached to a subnet, such as IR1 attached to subnet 312, determines whether it is a root node. Various implementations can affect how this determination is made. For example, IR1 may be configured by an operator as a root node when a tie-break must be made between multiple candidate root nodes. In another implementation, the candidate root nodes can be configured to communicate with each other to determine which node is to be the root node.

If the determination at 904 indicates that the router is a root node, then at 908, the router can prepare an LSA with a TLV including an indication that the router is attached to a subnet and is the designated root node. If the determination at 904, indicates that the router is not a root node, then at 906, the router can prepare an LSA without the TLV announcing it is a designated root node. Once the LSA has been prepared, then at 910, the LSA may be communicated within the area or level and an ABR may forward the LSA to CBRR 330. CBRR 330 can extract the TLV from the LSA and determine whether the router is to be selected as the root node based on the contents of the TLV. CBRR 330 may be configured with logic to perform this extraction and determination. This logic may be the same or similar to Ethernet extension receiver 86, which is shown and described with reference to node 30 in FIG. 2.

Fast Failover

In accordance with at least one embodiment, a cloud-based route reflector (e.g., node 30), comprises a process (e.g., SPF logic 66) that runs shortest path first (SPF) computations multiple times and maintains multiple minimum spanning trees (SPTs) (e.g., in SPT database 92) rooted at different points in the same or different topologies. Spanning trees can include subsets of the topology of an autonomous system (e.g., AS1). A client of this process, such as BGP-ORR (e.g., BGP-ORR 60), can query this SPT database to perform, for example, a best path computation from the perspective of the RR-client, thus advertising the optimal best path for that RR-client. Consequently, each RR-client can be associated with an SPT via configuration associating the RR-client to the root of the SPT. If the SPT root is unreachable from the CBRR, this can cause significant churn in the paths advertised to an RR-client associated with the SPT.

At least one embodiment of the present disclosure can resolve aforementioned issues (and more) associated with an SPT root that is unreachable from the CBRR. In at least one embodiment, the CBRR may perform a fast failover to a backup SPT. Multiple backup SPTs may be specified. A failover is generally intended to mean a fault tolerance function that can redirect network communications, functions, operations, etc. of a primary system or system component to a backup system or system component. In at least one embodiment, performing the fast failover can include: 1) an association of an RR-client to a failover policy group that describes the sequence of SPTs that are to be used to compute a best path for the RR-client, and 2) methods by which only the minimum required changes in the SPTs in each failover policy group are advertised to BGP-ORR and possibly other listening clients in the event of a failover. In at least one embodiment, the active root node (also referred to herein as 'primary root node') and the backup root are associated. A determination is made as to whether the roots are leaves in each other's SPT. The association is used to reduce the number of SPF computations. Finally, the backup routes are pre-computed.

Figure 10:
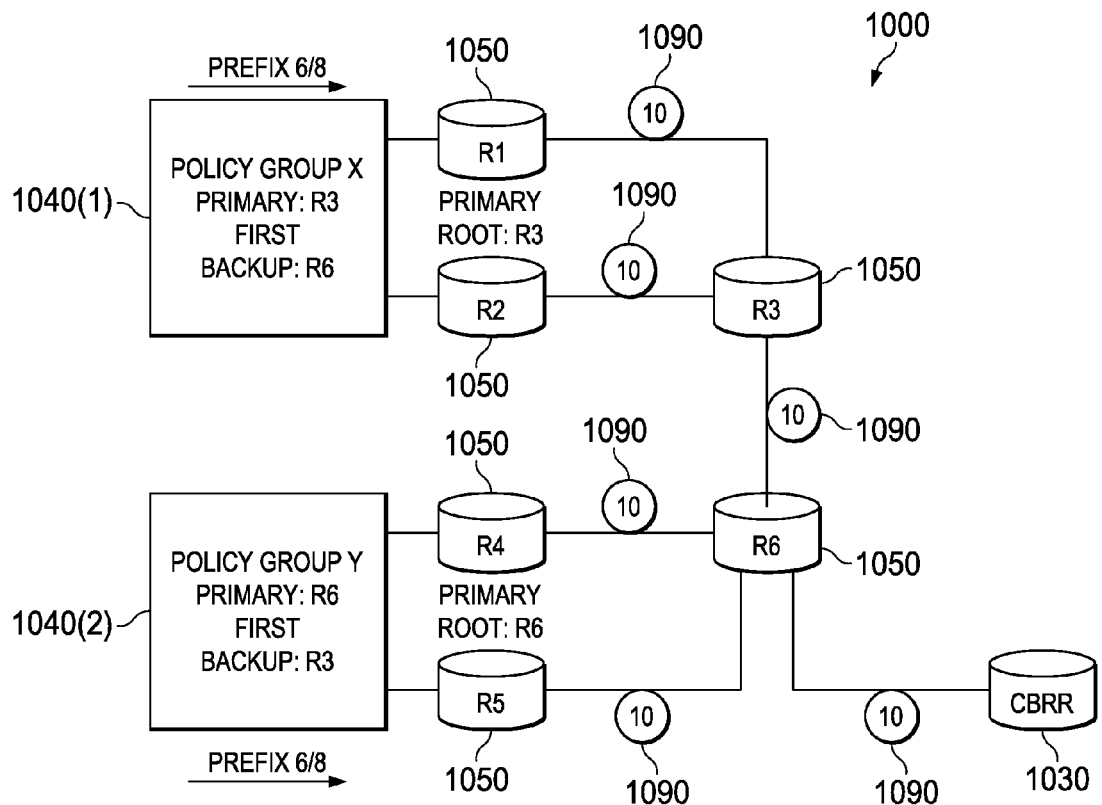
FIG. 10 is a simplified block diagram of a possible configuration of a communication system with failover group policies according to at least one embodiment.

Turning to FIG. 10, a more detailed description of embodiments for performing a fast failover to a backup SPT will now be provided. FIG. 10 is a simplified block diagram illustrating a possible configuration of a communication system 1000 according to at least one embodiment, which illustrates primary and backup root nodes. Communication system 1000 includes a cloud-based route reflector (CBRR) 1030, and several routers 1050 (R1-R9), which are part of an autonomous system. In this example, routers 1050 are intended to be RR-clients of CBRR 1030. In at least one embodiment, CBRR 1030 may be configured in the same or similar manner as node 30, and routers R1-R9 may be configured in the same or similar manner as node 50, both of which were previously shown and described herein.

In the example configuration of FIG. 10, primary root nodes and backup root nodes have been selected by CBRR 1030 for two routing groups (e.g., areas or levels) of the autonomous system. In the topology shown in FIG. 10, for a first routing group, R3 is the primary root node for R1 and R2, and R6 is the first backup root node for R1 and R2. R3 is also the primary root node for itself and R6 is the first backup root node for itself since R3 and R6 are RR-clients of CBRR 1030. For a second routing group, R6 may also be a primary root node for R4 and R5, while R3 may be a first backup root node for R4 and R5. R6 is also the primary root node for itself and R3 is the first backup root node for itself since R6 and R3 are RR-clients of CBRR 1030. It should be noted, however, that the topology is intended to represent costs/distances with R3 as the primary root node. Although not shown in FIG. 10, a configuration is possible in which other backup root nodes exist (e.g., secondary backup root node, tertiary backup root node, etc.). Also, in this example, failover policy group X 1040(1) is assigned to R1 and R2 (and R3), while failover policy group Y 1040(2) is assigned to R4 and R5 (and R6). In addition, example IGP metrics for next hops between connected pairs of routers R1-R6 are indicated at 1090. In this example, each next hop metric has a value of 10.

In FIG. 10, nodes with an IP address prefix of 6/8 can be reached via R1 or R5. With the configuration of root nodes R3 and R6, R2 knows that prefix 6/8 can be reached via R1 and R5, but that R1 is the preferred route for R2. R1 is preferred from R2 because its cost is 20, whereas the cost to reach prefix 6/8 via R5 is 30. If R3 fails, however, then the new root for R2 is R6. Therefore, the new best path to prefix 6/8 may change to R5. The operation of changing a best path selection from a first path based on an SPT rooted at a primary root node to a second path when the primary root node fails is referred to as 'failover'.

An SPF computation process can create a database of SPTs (e.g., SPT database 92). SPF logic (e.g., SPF logic 66) in a CBRR can perform these computations. Each SPT is rooted at an IGP node in the network. These SPTs are grouped via failover policy groups that are defined by an operator (e.g., a network administrator) or auto-generated as previously described herein. Each failover policy group can be identified by a unique identifier. The policy groups can identify a primary root node (or SPT) and one or more backup root nodes (or SPTs), in addition to the order in which the backup root nodes (if there are multiple backup root nodes) are to be activated. In FIG. 10, for example, policy group X is assigned to R1 and R2, while policy group Y is assigned to R4 and R5. Policy group X identifies R3 as a primary node and R6 as a backup node for R3. Policy group Y identifies R6 as the primary root node and R3 as a backup root node for R6. If either policy group identifies more than one backup root node, then the policy group can also define an order in which the multiple backup root nodes are to be activated in response to failure of active root nodes. Each RR-client (e.g., R1-R6) is associated with a failover policy group via its failover group identifier (group ID).

An SPT is a table of all the nodes in an IGP area (or multiple areas) along with their costs as computed by running SPF rooted at the SPT root. Therefore, all SPTs in a failover policy group should consist of the same number of IGP nodes. This can be accomplished by ensuring that all SPT roots in a policy group belong to the same IGP area or administrative region. An SPT can belong to multiple failover policy groups and have a different failover sequence number in each group. For example, an SPT root may be a primary root in one failover policy group, and a first backup root in another failover policy group. This example is illustrated in FIG. 10, where R3 is a primary root node in policy group X and is a backup root node in policy group Y.

Although SPTs consist of IGP nodes, typically, clients of the SPF computation process, such as BGP-ORR in CBRR 1030 (e.g., BGP-ORR 60 in node 30) and BGP in R1-R5 (e.g., BGP 65 in node 50), are interested in the IGP metric of interfaces of the IGP nodes, rather than the nodes themselves. Interfaces (or statically configured routes) attached to an IGP node (learned via link state advertisements (LSAs)) inherit the cost of the node. This information is typically stored in an interface database. Because all SPTs in a failover policy group consist of the same group of nodes, the interface database can be separate from the SPT database and only one interface database may be required.

When a change in topology occurs, one or more algorithms may be performed. In a first algorithm, an addition or a withdrawal of an interface or a static route causes a change in the interface database. Notification of the change in the database is provided to the client process (e.g., BGP 65) along with all failover policy groups in which the route was present. In a second algorithm, a change in adjacency (e.g., metric change, node addition/withdrawal) causes SPTs that are impacted to be recomputed. Failover policy groups are then communicated to the client process via Routing Information Base (RIB). A communication can include communicating all interface or static routes along with their metric, but only if the metric has changed.

The client process is not aware of which SPT in the failover policy group is the current active SPT, but simply knows the cost of an interface or static route in the context of a failover policy group. A BGP route reflection process uses this cost in its best path calculation (e.g., best path selection module 62) and advertises the optimal next hop to an RR-client associated with the failover policy group via configuration. The ordering of SPTs within the failover group (primary, first backup, secondary backup, etc.) can be defined via configuration or auto-generated by the CBRR.

One problem with the design is that a backup node for a given failover policy group could be an active root node for some other failover policy group. Enforcing a constrained SPF (i.e., where some nodes are excluded) for a backup root node requires that the CBRR runs the SPF process multiple times for a given root node depending on whether the node is an active root node or a backup root node for a given policy group.

Accordingly, embodiments disclosed herein can optimize the overall ORR route convergence. In at least one embodiment, the optimization can be implemented using delta databases (e.g., delta databases 94(1)-94(X)) in CBRR 1030 that track IGP metric differences between a primary SPT and a backup SPT. When a primary root node fails, only the metrics that have changed are communicated to listening clients (e.g., BGP process in RR-clients, BGP-ORR process in CBRR, etc.). A delta database can be configured to track the difference of the IGP metrics between an active SPT and a backup SPT. For example, in FIG. 10, a delta database associated with policy group X can track the difference between IGP metrics of an SPT rooted at R3 and IGP metrics of an SPT rooted at R6. Similarly, a delta database associated with policy group Y can track the difference between IGP metrics of an SPT rooted at R6 and IGP metrics of an SPT rooted at R3. The IGP metrics of the SPTs are typically the costs (or distances) associated with each node in the table. For example, in FIG. 10, for an SPT rooted at R3, R3 has a cost of 0, R1 has a cost of 10, R2 has a cost of 10, R6 has a cost of 10, R4 has a cost of 20, and R5 has a cost of 20. Because R3 is 20 metric units away from R5, and R6 is 10 metric units away from R5, there is a difference of −10 metric units between R3 and R6 for R5. This value of −10 may be mapped to R5 in a delta database belonging to policy X.

As previously mentioned, however, in at least some embodiments, clients of the SPF computation process (e.g., BGP 65 in node 50, BGP-ORR 60 of node 30), are interested in the IGP metric of interfaces of the IGP nodes, rather than the nodes themselves. All interfaces (or statically configured routes) attached to an IGP node inherit the IGP metrics (e.g., cost/distance) of the node. In at least one embodiment, the interface metrics for a primary SPT could be obtained from the SPT database and stored in an interface database for the primary root node. The interface metrics for a backup SPT could also be obtained from the SPT database and stored in an interface database for the backup root node. The differences between the IGP metrics of the interfaces in the primary interface database and the IGP metrics of the interfaces in the backup interface database may be stored in the delta database. In at least some embodiments, however, the information stored in the backup interface database may be combined in the delta database. Also, it should be noted that the interface databases could be configured in any number of possible ways. For example, the interface databases (primary, backup, and delta) may be stored in a single storage element as depicted by interface database 98. Alternatively, each of these interface databases may be stored individually or collectively in desired groups based on particular implementations and needs.

Figure 11:
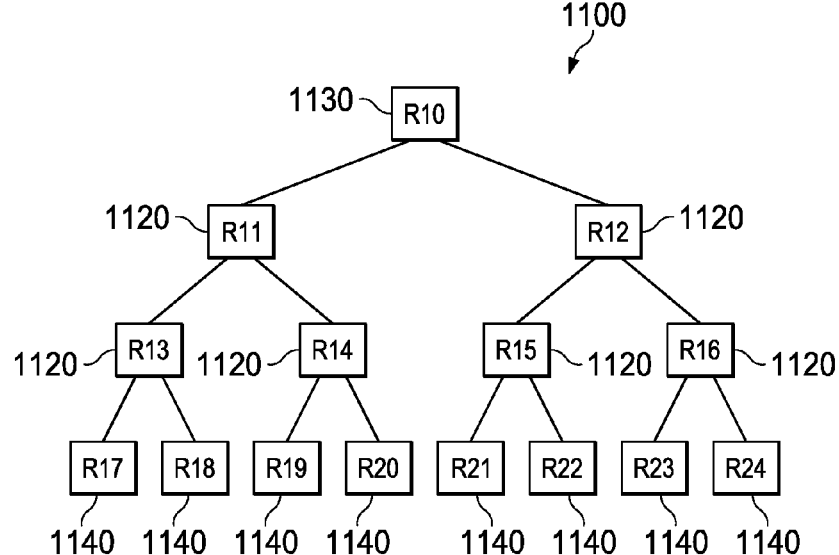
FIG. 11 is a simplified tree graph representing nodes in an example communication system according to at least one embodiment.

The optimization will now be explained with reference to an example SPT 1100 illustrated in FIG. 11. SPT 1100 includes a root node 1130 (R10), interior nodes 1120 (R11-R16), and leaf nodes 1140 (R17-R24). This optimization can be achieved as follows:

(1) An active root and a backup root of a given failover policy group are evaluated using a standard minimum spanning tree algorithm to determine whether they are leaves in each other's trees (i.e., neither of them use the other one as a transit). For example, if R17 is a backup root node of R10, and if R10 is a leaf node in R17's SPT, then this condition is satisfied.

(2) When (1) above is satisfied (i.e., active and backup root nodes are leaf nodes in each other's trees), an interface database can be created for both the active root and the backup root and the difference in the route metrics from both these databases can be tracked (e.g., in a delta database) so that they can be incrementally downloaded. In at least some embodiments, the delta database can be separate from the backup interface database. In other embodiments, the information in the backup interface database may be stored in the delta database, rather than a separate backup interface database.

(3) When (1) above is NOT satisfied (i.e., active and backup roots are interior nodes in each other's trees), a constrained SPF process is performed for the backup roots. The difference in the route metrics from both these databases can be tracked (e.g., in the delta database) so that they can be incrementally downloaded. For example, if R11 is a backup root node of R10, and if R10 is an interior node of R11's SPT, then condition (1) above is not satisfied. In this case, a constrained SPF process may be performed for backup root node R11 by omitting R10. Thus, the SPT rooted at R11 will not include R10. In at least some embodiments, however, the constrained SPF process may be performed if the primary root is an interior node of the backup root's tree, even if the backup root is not an interior node of the active root's tree.

The above strategy optimizes the number of SPF runs performed when there is a change in the topology, such as a change in adjacency or SPT root failure. For example, assume there are two failover policy groups:

Group 1: Active 1.1.1.1 and backup 2.2.2.2
Group 2: Active 2.2.2.2 and backup 1.1.1.1

In this scenario, a CBRR normally generates 4 SPTs. In at least one embodiment disclosed herein, however, a CBRR may generate only 2 SPTs in a best case and 4 in a worst case. Moreover, the chances of a CBRR generating only 2 SPTs is higher because the roots selected are likely to be the cluster area border routers (ABRs) and, therefore, may become leaf nodes in each other's trees.

Figure 12:
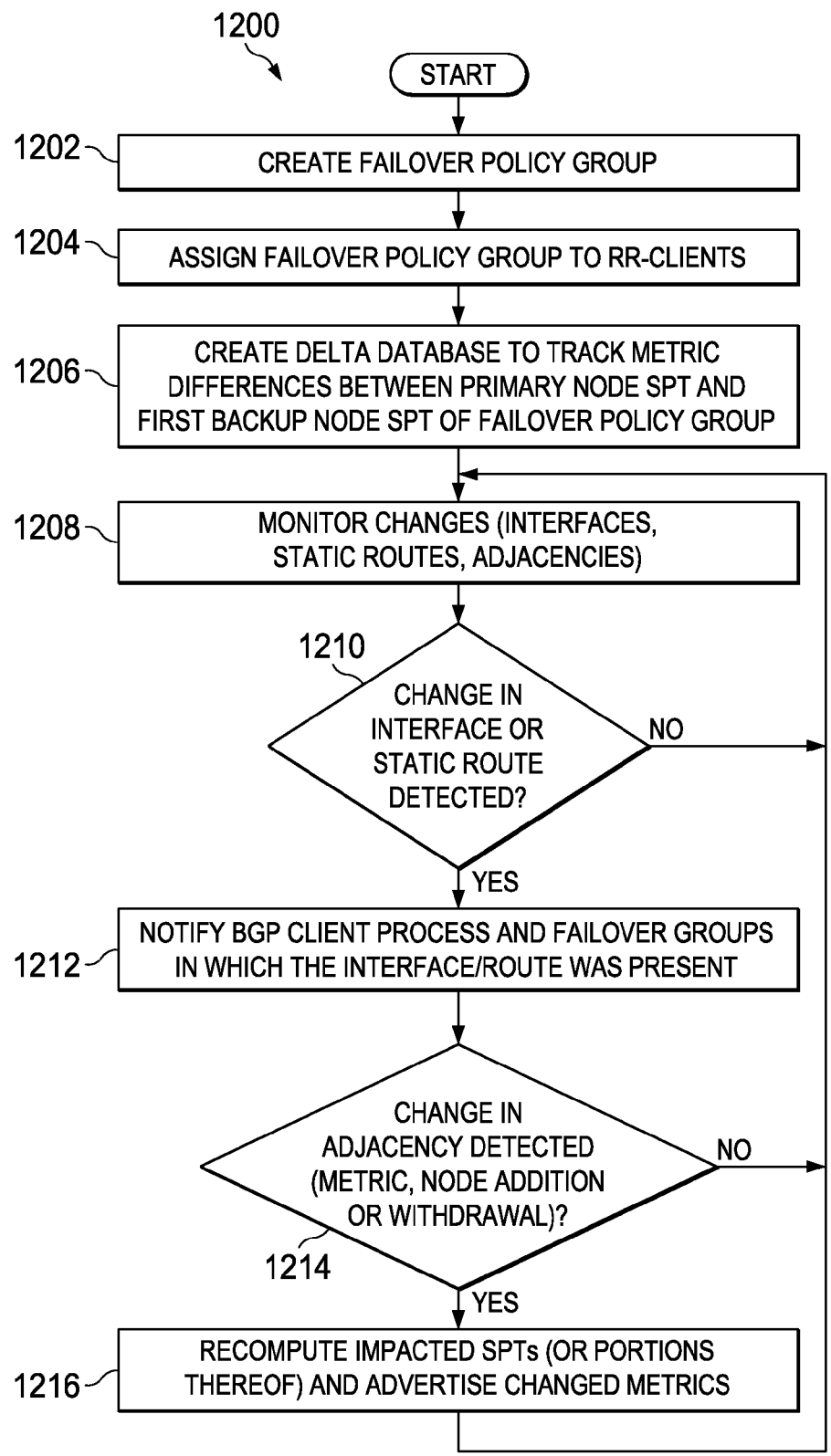
FIG. 12 shows a simplified flowchart illustrating potential operations associated with a communication system according to at least one embodiment.
Figure 13:
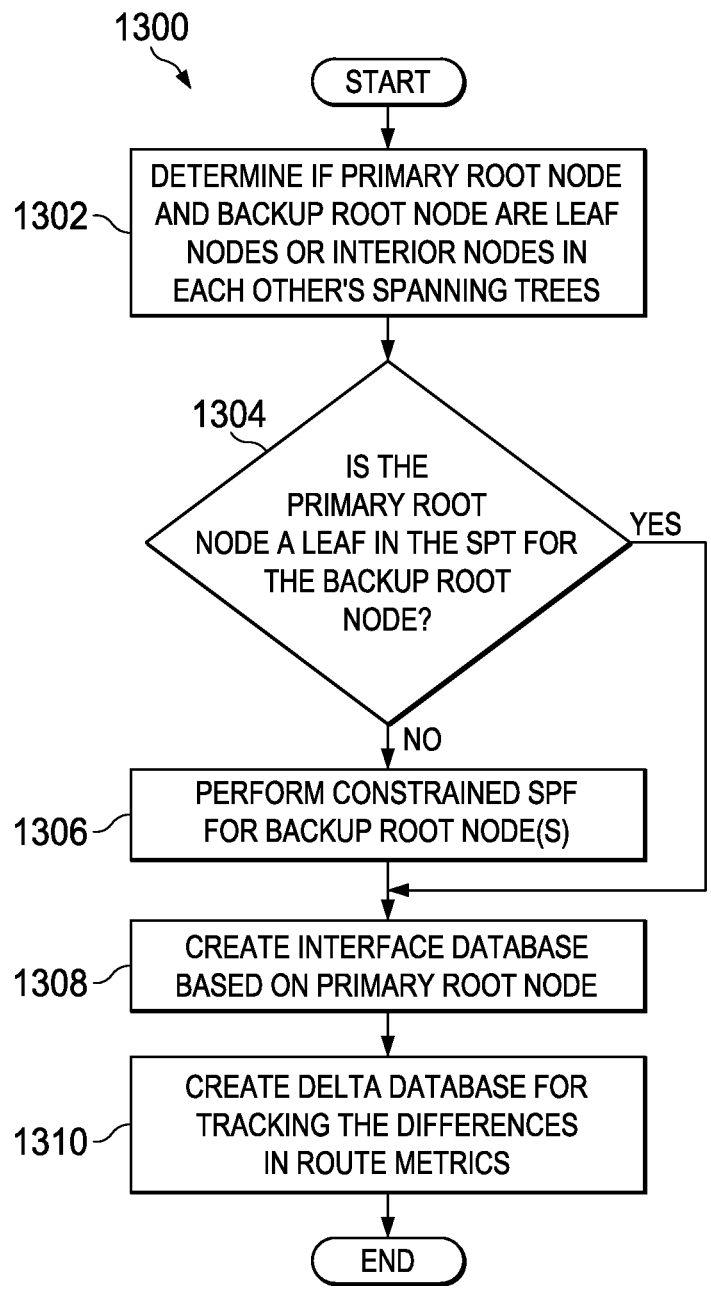
FIG. 13 shows a simplified flowchart illustrating potential operations associated with a communication system according to at least one embodiment.
Figure 14:
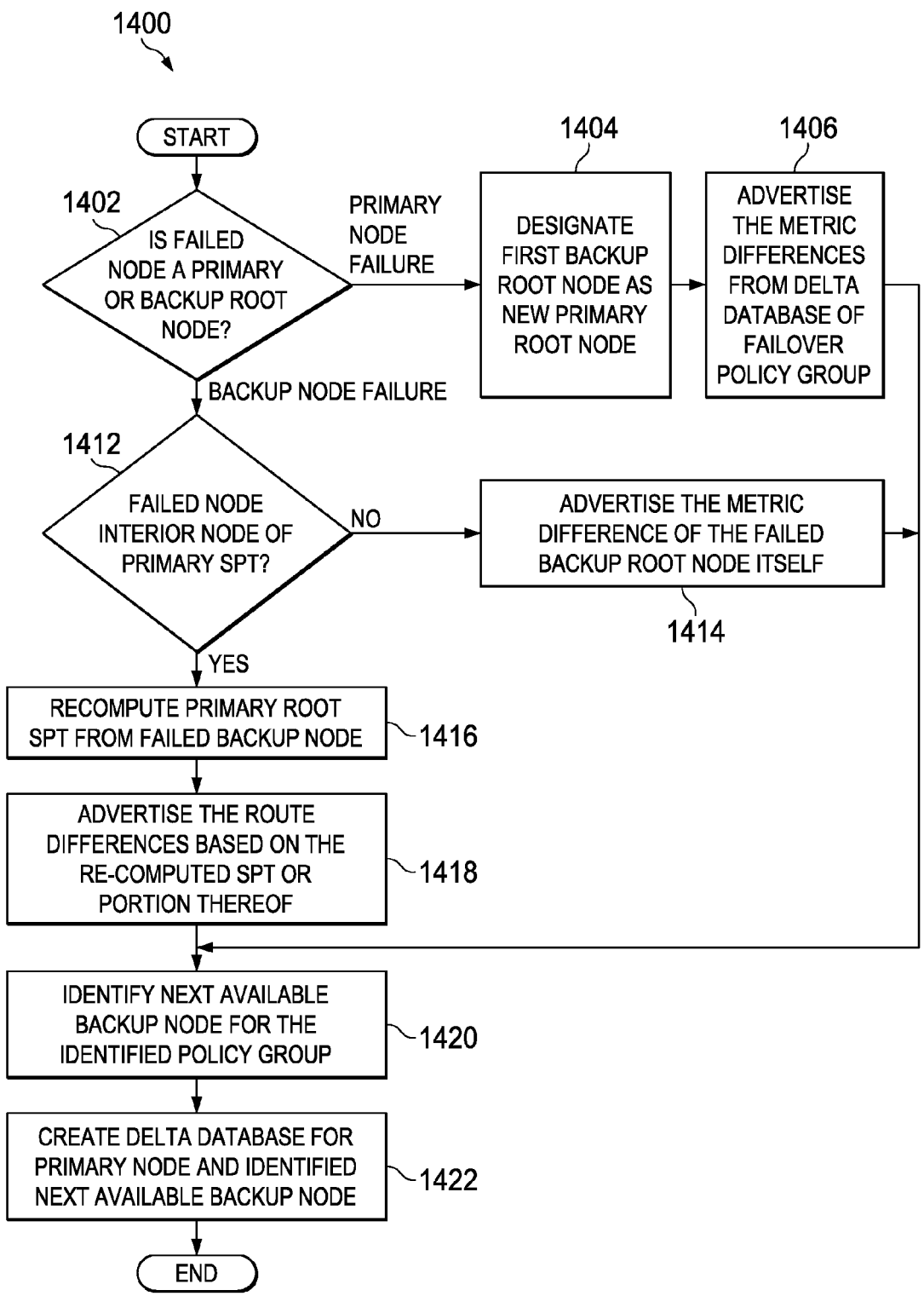
FIG. 14 shows a simplified flowchart illustrating potential operations associated with a communication system according to at least one embodiment.

Turning to FIGS. 12, 13 and 14, simplified flowcharts illustrate possible flows 1200, 1300 and 1400, respectively that may be associated with one or more embodiments related to fast failover as disclosed herein. In at least one embodiment, one or more sets of operations correspond to activities of FIGS. 12-14. A cloud-based route reflector (e.g., 30, 330, 1030) may utilize the one or more sets of operations. The cloud-based route reflector may comprise means, such as at least one processor (e.g., 39), for performing the operations. In an embodiment, at least some operations of flows 1200, 1300 and 1400 may be performed by a failover module (e.g., 90) in the cloud-based route reflector.

For ease of illustration, FIG. 12 is discussed below with reference to communication system 1000 of FIG. 10. With reference to FIG. 12, at 1202, a failover policy group may be created. This can occur after ORR root nodes have been selected for communication system 1000, and SPTs have been created for each ORR root node. A failover policy group can define a sequence of SPTs that are to be used to compute a best path for RR-clients (e.g., R1 and R2) to which the policy group is assigned. The failover policy group can include a primary root node and one or more backup root nodes. The failover policy group, such as failover policy group X, can be configured by an authorized user or may be automatically generated. At 1204, the failover policy group can be assigned to one or more RR-clients.

At 1206, a delta database can be created to track metric differences between an SPT rooted at a primary (active) root node and an SPT rooted at a backup root node of the failover policy group. In some embodiments, this delta database can track the metric differences between the nodes of the two SPTs. In other embodiments, a primary interface database of the primary root node and a backup interface database of the backup root node can be created. The differences between the interface metrics can be tracked in a delta database. As previously described herein, the backup interface database and the delta database may be combined. The process for creating a delta database will be described in more detail with reference to FIG. 13.

At 1208, changes in the network are monitored. Interface changes, static route changes, and adjacency changes are monitored for indications that a router, interface, or static route has been withdrawn or added to the network. At 1210, a determination is made as to whether a change in an interface or static route has been detected. If a change has been detected, then at 1212, CBRR can notify the BGP client process (e.g., BGP 65, BGP-ORR 60) and failover policy groups in which the interface or static route was present.

At 1214, a determination is made as to whether a change in adjacency is detected. A change in adjacency could include, for example, a metric change, a node addition or a node withdrawal. If no change is detected, flow continues at 1208 where monitoring changes in the network continues. If a change in adjacency is detected, however, then at 1216, the impacted SPTs (or impacted portions of SPTs) can be recomputed and the resulting changed metrics can be advertised to listening clients. The process for recomputing the impacted SPTs will be described in more detail with reference to FIG. 14.

Turning to FIG. 13, for ease of illustration, FIG. 13 is discussed below with reference to SPT 1100 of FIG. 11. In at least one embodiment, one or more sets of operations corresponding to flow 1300 are related to creating a delta database to track metric changes between a primary routes and backup routes. The processing of FIG. 13 may correspond to 1206 of FIG. 12.

At 1302, the CBRR determines whether a primary (or active) root node and a backup root node are leaves in each other's spanning trees or interior nodes in each other's spanning trees. For example, with reference to FIG. 11, if R10 is a primary root node, then if the backup root node is designated as any of nodes R11-R16, the backup root node is determined to be an interior node of R10's SPT 1100. If the backup root node is designated as any one of nodes R17-R24, then the backup root node is determined to be a leaf node of R10's SPT 1100. Similarly, R10's placement in the backup root node's SPT can be evaluated to determine whether R10 is a leaf node or an interior node of the backup root node's SPT.

At 1304, if it is determined that the primary root node is not a leaf node in the backup root node's SPT (i.e., the primary root node is an interior node of the backup root node's SPT), then at 1306, a constrained SPF process may be performed for the backup root node. For example, if R10 is a backup root node to a primary root node R11, then a constrained SPF can be run for R10. In this case, the SPF assumes that R11 is not available and runs the SPF process for R10 under that assumption. Thus, the resulting SPT for R10 (as a backup of R11) would not include R11.

If it is determined at 1304, that the primary root node is a leaf node in the backup root node's SPT (or if constrained SPF is performed at 1306), then at 1308, an interface database may be created for the primary root node. This primary interface database can include metrics of interfaces based on the SPT of the primary root node. At 1310, a delta database can be created. In at least one embodiment, the delta database can include interface metrics based on the SPT of the backup root node. In addition, the differences between the interface metrics of the backup root node SPT and the interface metrics of the primary root node SPT can be tracked in the delta database. In other embodiments, the interface metrics of the backup root node SPT may be stored in a separate backup interface database. In a further embodiment, the delta database can include the metric differences between the nodes in the SPT of the primary root node and the nodes in the SPT of the backup root node. If the primary node fails, the delta database can be used to communicate only metrics that will change due to the backup root note becoming the active root node. For example, only metrics in the delta database that are not equal to zero may be communicated. Furthermore, the SPT may not have to be recalculated (e.g., when backup root node is a leaf in primary root node SPT), which can potentially save significant network resources and bandwidth.

Turning the FIG. 14, for ease of illustration, FIG. 14 is discussed below with reference to communication system 1000 of FIG. 10. In at least one embodiment, one or more sets of operations corresponding to flow 1400 are related to recomputing impacted SPTs when a primary or backup root node fails. The processing of FIG. 14 may correspond to 1216 of FIG. 12.

Initially, at 1402, a determination is made as to whether the failed node is a primary root node (e.g., R3) or a backup root node (e.g., R6). As used herein, the term 'failed' with reference to a node is intended to mean the node is no longer performing forwarding actions. This can include for example, a node that has malfunctioned, lost power, been subjected to a malware attack, been withdrawn intentionally or unintentionally from the network, or any other reason that could cause the node to no longer forward traffic.

If the node is determined to be a primary root node, then at 1404, the first backup root node in the failover group policy, is designated as the new primary root node. For example, if the current primary root node is determined to have failed, then the SPT of R6, which is defined in the sequence of SPTs in policy group X, can become the new primary root node. At 1406, metric differences from the delta database associated with the failover policy group can be advertised to any listening clients (e.g., BGP-ORR in CBRR, BGP in RR-clients to which the failover policy is assigned). For example, these differences can be used to update the metrics information in listening clients, without having to perform SPF on the backup root node and download the entire SPT for the backup root node. For example, if R3 is the primary node for R1 and R2 in communication system 1000, and if R3 fails, then the delta database associated with policy group X can be used to communicate metric differences (e.g., that are not equal to zero) to R1 and R2. These metric differences can be used by R1 and R2 to update their own SPT database.

At 1420, the next available backup root node can be determined from the failover policy group and designated as the first backup root node to the new primary root node. At 1422, a new delta database can be created to track metric differences between interfaces and/or nodes of the current primary root node and interfaces and/or nodes of the current first backup root node. The process for creating the new delta database may be the same or similar to the processing described with reference to FIG. 13.

With reference again to 1402, if the failed node is determined to be a backup root node at 1402, then at 1412 a determination can be made as to whether the failed node is an interior node of the SPT rooted at the primary root node. If the failed node is not an interior node (i.e., the failed backup root node is a leaf node of the primary root node's SPT), then SPF does not need to be performed on the primary root node. Instead, at 1414, the metric difference of the failed backup root node can be communicated to listening clients (e.g., BGP-ORR in CBRR, BGP in RR-clients to which the failover policy is assigned). Flow can then pass to 1420, where a next available backup node can be identified according to the failover policy group, and at 1422, a new delta database can be created based on the new primary root node and the new backup root node.

At 1412, however, if the failed backup root node is determined to be an interior node of the primary root node's SPT, then at 1416, the SPT of the primary root node can be recomputed for all of the child nodes (and lower) of the backup root node in the primary root node's SPT. At 1418, the changes to the SPT may be communicated to the listening clients. At 1420, a next available backup node can be identified according to the failover policy group, and at 1422, a new delta database can be created based on the new primary root node and the new backup root node. Both 1420 and 1422 have been previously described herein.

Numerous advantages may be provided by using embodiments disclosed herein. For example, embodiments disclose herein offer efficient SPF computation. In addition, the minimum required changes can be advertised to a client BGP route reflection process (e.g., BGP-ORR 60) and other listening clients (e.g., BGP 65) in the event of a network change, including an SPT failover.

Variations and Implementations

Within the context of the disclosure, a network used herein represents a series of points, nodes, or network elements of interconnected communication paths for receiving and transmitting packets of information that propagate through a communication system. A network offers communicative interfaces between sources and/or hosts, and may be any local area network (LAN), wireless local area network (WLAN), virtual private network (VPN), or any other appropriate architecture or system that facilitates communications in a network environment depending on the network topology. A network can comprise any number of hardware and/or software elements coupled to (and in communication with) each other through a communication medium.

Communications in a network environment are referred to herein as 'network traffic' or 'traffic', which may be inclusive of packets. A packet is a formatted unit of data, and can contain both control information (e.g., source and destination addresses, etc.) and data, which is also known as payload. Network traffic can be sent and received according to any suitable communication messaging protocols. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), etc.). The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, replies, queries, communications, etc. are forms of network traffic, and therefore, may comprise packets.

As used herein, the term 'network element' is meant to encompass any of the aforementioned elements, as well as routers, switches, wireless access points (WAPs), gateways, bridges, loadbalancers, appliances, firewalls, servers, processors, modules (any of which may be physical or virtually implemented on physical hardware) or any other suitable device, component, element, proprietary appliance, or object that is operable to exchange information in a network environment. A network element may include any suitable hardware, software, components, modules, interfaces, or objects that facilitate the operations thereof. This may be inclusive of appropriate algorithms and communication protocols that allow for the effective exchange of data or information.

In at least one example implementation, nodes with automatic ORR root address assignment and fast failover capabilities include logic to achieve (or to foster) the activities as outlined herein. This could include the implementation of TLV elements to provide reachability information for nodes without forwarding capabilities, to provide advertisement of originating routers, and/or to allow an ORR root address as part of an Ethernet subnet. Note that in at least one example, each of these elements can have an internal structure (e.g., processors, memory elements, network interface cards, etc.) to facilitate some of the operations described herein. In some embodiments, these activities may be executed externally to these elements, or included in some other network element to achieve this intended functionality. In at least one embodiment these nodes may include logic (or reciprocating logic) that can coordinate with other network elements in order to achieve the operations, as outlined herein. Furthermore, one or several devices may include any suitable algorithms, hardware, firmware, software, components, modules, interfaces, or objects that facilitate the operations thereof.

In certain example implementations, the automatic root address assignment, fast failover and TLV extension functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by one or more processors or other similar machine, instructions in software, hardware, firmware, or any combination thereof, etc.). This tangible media may be non-transitory in at least one embodiment. In some of these instances, one or more memory elements can store data used for the operations described herein. This includes the memory elements being able to store software, logic, code, and/or processor instructions that are executed to carry out the activities described herein. A processor can execute any type of instructions associated with the data to achieve the operations detailed herein. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements) can include memory for storing information to be used in achieving the automatic root address assignments, fast failover and TLV features, as outlined herein. Additionally, these network elements may include at least one processor that can execute software, an algorithm, or other instructions to perform the automatic root address assignment, fast failover and TLV extension operations, as disclosed herein. These network elements may further keep information, to be used in achieving the automatic root address assignment, fast failover and TLV extension activities as discussed herein, in any suitable memory element (random access memory (RAM), read only memory (ROM), EPROM, EEPROM, ASIC, etc.), software, hardware, or in any other suitable component, device, element, or object where appropriate and based on particular needs. Any of the memory items discussed herein (e.g., repositories, stores, databases, tables, caches, buffers, etc.) should be construed as being encompassed within the broad term 'memory element.' Similarly, any of the potential processing elements, modules, and machines described herein should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that the systems described herein are readily scalable and can accommodate a large number of components, as well as more complicated/sophisticated arrangements and configurations. Accordingly, the examples provided should not limit the scope or inhibit the broad teachings of the automatic root address assignment, fast failover and TLV features as potentially applied to a myriad of other architectures or implementations.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

Note that in this Specification, references to "optimize," "optimization," "optimized", "optimal" and related terms are terms of art that refer to improvements in speed and/or efficiency of a specified outcome and do not purport to indicate that a process for achieving the specified outcome has achieved, or is capable of achieving, a perfectly speedy/ perfectly efficient state.

It is also important to note that the activities, interactions, and operations shown and described herein illustrate only some of the possible interoperability scenarios and patterns that may be executed by, or within, the nodes with automatic root address assignment, fast failover and TLV extension capabilities. Some of these activities, interactions, and/or operations may be deleted or removed where appropriate, or may be modified or changed considerably without departing from the scope of the present disclosure. In addition, a number of these activities, interactions, and/or operations have been described as being executed concurrently with, or in parallel to, one or more additional activities, interactions, and/or operations. However, the timing of these activities, interactions, and/or operations may be altered considerably. The preceding operational flows have been offered for purposes of example and discussion. Substantial flexibility is provided by nodes with automatic root address assignment, fast failover and TLV extension capabilities in that any suitable arrangements, chronologies, configurations, and timing mechanisms may be provided without departing from the teachings of the present disclosure. Additionally, these activities can be facilitated by various modules and/or components which can be suitably combined in any appropriate manner, or partitioned in any appropriate manner, and which may be based on particular configuration and/or provisioning needs.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although embodiments herein have been illustrated with reference to particular elements and protocols, these elements and protocols may be replaced by any suitable architecture, protocols, and/or processes that achieve the intended functionality of nodes with automatic root address assignment, fast failover and TLV extension capabilities as disclosed herein.

What is claimed is:

1. A method, comprising:
   at a cloud-based route reflector:
      receiving, from a first node in an autonomous system, a routing protocol packet that originated from a client node in the autonomous system;
      based on the routing protocol packet, identifying the first node as a candidate root node of a first routing group in the autonomous system;
      identifying the client node based on a locally stored neighbor address of the client node used in a first routing protocol;
      mapping the locally stored neighbor address of the client node to routing information in the routing protocol packet received via a second routing protocol, wherein the routing information includes an identifier of the first routing group; and
      associating the locally stored neighbor address of the client node with the candidate root node and with the first routing group.

2. The method of claim 1, further comprising: determining the first node and a second routing group are advertised in a second routing protocol packet.

3. The method of claim 2, wherein determining the first node is advertised in the second routing protocol packet includes determining the first node is advertised based on a router identifier of the first node.

4. The method of claim 1, wherein the routing protocol packet includes information indicating the first node is to be a root node.

5. The method of claim 1, wherein the first node is one of a plurality of nodes identified as candidate root nodes of the first routing group, the method further comprising:
   selecting a primary root node from the plurality of nodes.

6. The method of claim 5, further comprising:
   computing respective distances between the client node and each one of the candidate root nodes; and
   determining a shortest one of the respective distances, wherein the primary root node is selected based on the shortest one of the respective distances.

7. The method of claim 5, further comprising:
selecting a backup root node from the plurality of nodes.

8. The method of claim 7, wherein selecting the backup root node includes:
computing respective spanning trees rooted at one or more of the plurality of nodes; and
selecting the backup root node based, at least in part, on whether the primary root node is a leaf node in any one of the respective spanning trees.

9. The method of claim 5, wherein each of the plurality of nodes is an area border router.

10. The method of claim 1, further comprising:
configuring a second routing protocol packet according to the second routing protocol, the second routing protocol packet indicating that reachability information for the cloud-based route reflector is to be used only for control plane traffic, wherein the second routing protocol packet is communicated to one or more nodes in the autonomous system.

11. The method of claim 1, wherein:
the routing protocol packet indicates the first node is associated with a subnet and is to be a root node.

12. The method of claim 1, further comprising:
determining a router identifier (ID) of the first node by examining a Type-Length Value (TLV) element in the routing protocol packet, wherein the first node is an edge router of the first routing group.

13. The method of claim 1, wherein:
the locally stored neighbor address is a border gateway protocol (BGP) neighbor address of the client node that corresponds to an interface address advertised by the client node.

14. The method of claim 1, wherein the first routing protocol is a Border Gateway Protocol (BGP) and the second routing protocol is an Interior Gateway Protocol (IGP).

15. At least one non-transitory computer readable storage media comprising instructions stored thereon and when executed cause one or more processors to:
receive, from a first node in an autonomous system, a routing protocol packet that originated from a client node in the autonomous system;
based on the routing protocol packet, identify the first node as a candidate root node of a first routing group in the autonomous system;
identify the client node based on a locally stored neighbor address of the client node used in a first routing protocol;
map the locally stored neighbor address of the client node to routing information received via a second routing protocol, wherein the routing information includes an identifier of the first routing group; and
associate the locally stored neighbor address of the client node with the candidate root node and with the first routing group.

16. The at least one non-transitory computer readable storage media of claim 15, further comprising instructions that cause the one or more processors to:
determine the first node and a second routing group are advertised in a second routing protocol packet.

17. The at least one non-transitory computer readable storage media of claim 15, wherein the routing protocol packet includes information indicating the first node is to be a root node.

18. The at least one non-transitory computer readable storage media of claim 15, wherein the first node is one of a plurality of nodes identified as candidate root nodes of the first routing group, and further comprising instructions that cause the one or more processors to:
select a primary root node from the plurality of nodes.

19. The at least one non-transitory computer readable storage media of claim 18, further comprising instructions that cause the one or more processors to:
compute respective distances between the client node and each one of the candidate root nodes; and
determine a shortest one of the respective distances, wherein the primary root node is selected based on the shortest one of the respective distances.

20. An apparatus, comprising:
a cloud-based node including:
one or more processors; and
logic that, when executed by the one or more processors:
receives, from a first node in an autonomous system, a routing protocol packet that originated from a client node in the autonomous system;
based on the routing protocol packet, identifies the first node as a candidate root node of a first routing group in the autonomous system;
identifies the client node based on a locally stored neighbor address of the client node used in a first routing protocol;
maps the locally stored neighbor address of the client node to routing information in the routing protocol packet received via a second routing protocol, wherein the routing information includes an identifier of the first routing group; and
associates the locally stored neighbor address of the client node with the candidate root node and with the first routing group.

21. The apparatus of claim 20, further comprising logic that, when executed by the one or more processors:
determines the first node and a second routing group are advertised in a second routing protocol packet.

22. The apparatus of claim 20, wherein the first node is one of a plurality of nodes identified as candidate root nodes of the first routing group, the apparatus further comprising logic that, when executed by the one or more processors:
selects a primary root node from the plurality of nodes; and
selects a backup root node from the plurality of nodes.

23. The apparatus of claim 20, wherein the routing protocol packet includes information indicating the first node is to be a root node.

24. The apparatus of claim 20, wherein the first node is one of a plurality of nodes identified as candidate root nodes of the first routing group, the apparatus further comprising logic that, when executed by the one or more processors:
selects a primary root node from the plurality of nodes.

25. The apparatus of claim 24, further comprising logic that, when executed by the one or more processors:
computes respective distances between the client node and each one of the candidate root nodes; and
determines a shortest one of the respective distances, wherein the primary root node is selected based on the shortest one of the respective distances.

* * * * *